United States Patent
Carreker

(10) Patent No.: US 9,174,750 B2
(45) Date of Patent: Nov. 3, 2015

(54) VARIABLE SURFACE LANDING PLATFORM (VARSLAP)

(71) Applicant: Raymond George Carreker, Denver, CO (US)

(72) Inventor: Raymond George Carreker, Denver, CO (US)

(*) Notice: Subject to any disclaimer, the term of this patent is extended or adjusted under 35 U.S.C. 154(b) by 0 days.

(21) Appl. No.: 14/629,119

(22) Filed: Feb. 23, 2015

(65) Prior Publication Data

US 2015/0166201 A1    Jun. 18, 2015

Related U.S. Application Data

(62) Division of application No. 13/576,830, filed as application No. PCT/US2010/023507 on Feb. 8, 2010, now Pat. No. 8,960,600.

(51) Int. Cl.
*B64G 1/62* (2006.01)
*B64G 1/10* (2006.01)

(52) U.S. Cl.
CPC .......... *B64G 1/62* (2013.01); *B64G 2001/1071* (2013.01)

(58) Field of Classification Search
CPC ........ B64C 25/32; B64C 25/52; B64C 25/62; B64C 25/001; B64C 25/00; B64C 25/20; B64G 1/62; B64G 2001/1071
See application file for complete search history.

(56) References Cited

U.S. PATENT DOCUMENTS

| | | | |
|---|---|---|---|
| 2,698,968 A | 5/1955 | Bubb et al. | |
| 3,128,970 A | 4/1964 | Tinajero et al. | |
| 3,143,321 A | 8/1964 | McGehee et al. | |
| 3,175,789 A | 3/1965 | Blumrich | |
| 3,243,149 A | 3/1966 | Burns | |
| 3,295,798 A * | 1/1967 | Webb | 244/100 R |
| 3,484,826 A | 12/1969 | McCarthy, Jr. | |
| 4,478,379 A | 10/1984 | Kerr | |
| 5,613,580 A | 3/1997 | Young | |
| 5,829,773 A | 11/1998 | Rajaee | |
| 6,237,875 B1 | 5/2001 | Menne et al. | |
| 2006/0163427 A1 | 7/2006 | Ducos et al. | |
| 2006/0290185 A1 | 12/2006 | Moreschi | |
| 2007/0221783 A1 | 9/2007 | Parks et al. | |

FOREIGN PATENT DOCUMENTS

| | | |
|---|---|---|
| CN | 201272481 Y * | 7/2009 |
| RU | 2278800 C2 | 6/2006 |
| RU | 2364550 C2 | 8/2009 |
| SU | 39499 A1 | 10/1934 |
| WO | 9744240 A1 | 11/1997 |

OTHER PUBLICATIONS

International Search Report issued in PCT Application No. PCT/US2010/023507 on Sep. 27, 2010.

* cited by examiner

*Primary Examiner* — Tien Dinh
*Assistant Examiner* — Richard R Green
(74) *Attorney, Agent, or Firm* — Cozen O'Connor

(57) ABSTRACT

In one embodiment, a variable surface landing platform (VARSLAP) includes a base for contacting a landing surface; at least 3 adjustable struts interconnected with the base, wherein each strut is bisected by a strut actuator-housing, and wherein the at least 3 adjustable struts are interconnected to a main body aerospace craft (MAC); a sensor array on the base; and an attitude determination and control system (ADCS).

6 Claims, 21 Drawing Sheets

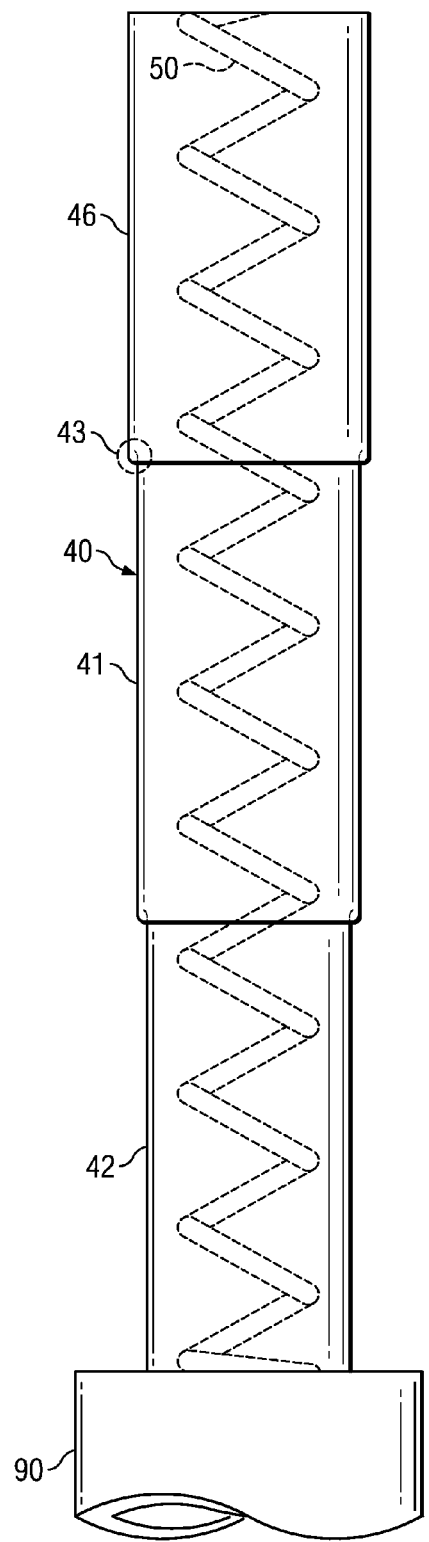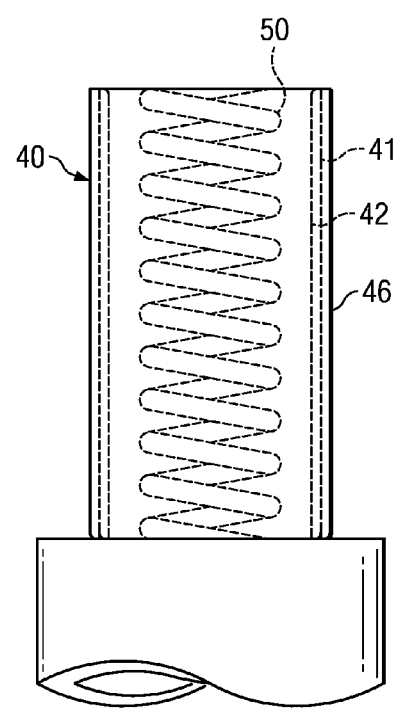
FIG. 22
FIG. 23

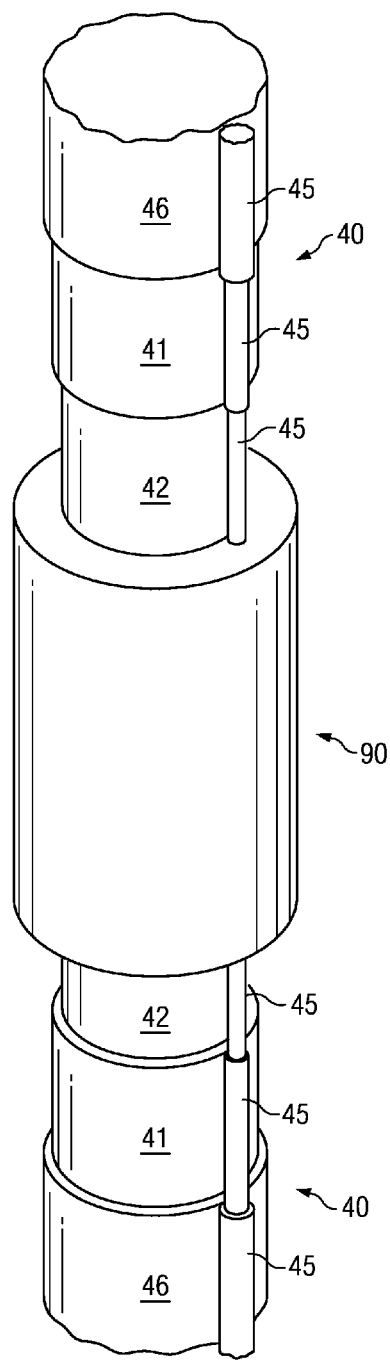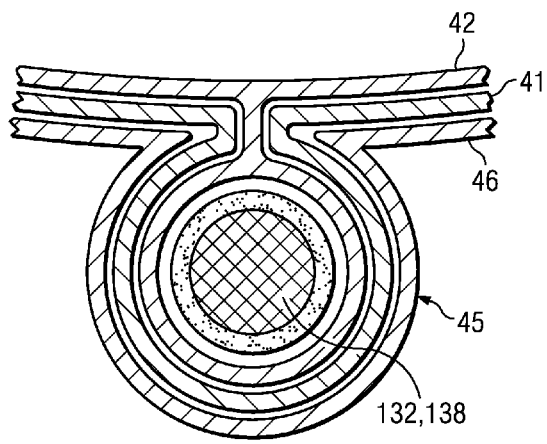
FIG. 34
FIG. 33

VARIABLE SURFACE LANDING PLATFORM (VARSLAP)

BACKGROUND

Embodiments of the VARSLAP relate to apparatuses used by the aerospace industry. More specifically, embodiments of the VARSLAP relates to the secure vertical touchdown landing of airborne vehicles and objects.

DESCRIPTION OF THE RELATED ART

Any discussion of the prior art throughout the specification should in no way be considered as an admission that such prior art is widely known or forms part of common knowledge in the field.

The primary objective of sending a multimillion dollar aerospace craft to land on another world is that the vehicle arrives in a safe and secure manner. Probably the most difficult phase of the Entry, Descent, and Landing (EDL) sequence is the actual landing or touchdown. Throughout the history of space flight the pursuit of safe landing methods has initiated extensive mapping of potential landing sites and the development of a variety of hardware and techniques used for touchdown. The Surveyor Moon probes of the 1960s landed with the aid of retrorockets to control descent, landing radar to gauge altitude, and three footpads, each equipped with crushable aluminum honeycomb-filled cylinders as shock absorbers. After touchdown, Surveyor 5 slid down the 20° slope of a crater though, apparently due to its low mass and low profile, was undamaged. The manned Apollo Lunar Modules were equipped with retrorockets, radar, four aforementioned shock absorber-equipped footpads and, significantly, human pilots to monitor the EDL sequence. On the Apollo II module "Eagle", Astronaut Neil Armstrong had to take control of the vehicle from the command computer and make an impromptu landing at a more distant, even-surfaced area when he saw that the predetermined landing area was actually strewn with large boulders. The Mars Viking Lander probes of the 1970s successfully landed on a level surface by employing parachutes, retrorockets, and a landing gear similar to that of the Apollo Lunar Modules. Optimal landing occurs when vertical velocity reaches zero due to the opposing thrust of the retrorockets just as the legs make contact with the surface, otherwise the aerospace craft could tip over and sustain damage or loss if landed on an uneven, rocky surface. In part because of this hazard, the 1997 Mars Pathfinder probe landing consisted of a sequence whereby the aerospace craft deployed a parachute, fired descent thrusters only for a limited duration and, finally, inflated airbags which completely encompassed the vehicle before it dropped to the surface and bounced and rolled to a stop. The possible tearing and subsequent deflation of the airbags were a constant concern of the engineers and mission controllers. The Mars Polar Lander of 1999 crashed when the jolt of deploying its landing legs apparently wrongly triggered a signal telling the computer that it had already touched down. The computer then prematurely turned off the decent thrusters causing the vehicle to fall at a great height. As a result, the Mars Spirit and Opportunity probe landings of 2004 returned to the Mars Pathfinder airbag method. The Mars Phoenix probe successfully touched down onto a flat surface in 2008 using the parachute and thruster descent to surface method attempted previously by the Mars Polar Lander. Space exploration is mainly a collaboration between scientists and engineers whose goals and visions are limited by practical considerations. For example, geologists, who tend to advocate landing in more interesting (i.e., rugged) sites, are invariably overruled by more conservative engineers who, knowing the limitations of the aerospace crafts, argue for less interesting (i.e., flatter and safer) landing sites. More specifically, recent research efforts have been made towards investigating the possibility of locating and procuring water ice within lunar craters. Having direct access to such environments is necessarily the logical first step in such an endeavor. The one crucial requirement influencing the methods and materials used for extraterrestrial landings is the absolute necessity of identifying safe, flat landing sites. If space exploration is to progress beyond this constraint, a more advanced, uniform, and adaptable type of landing procedure and apparatus is needed.

BRIEF SUMMARY

Embodiments of a variable surface landing platform apparatus overcome the problems associated with the prior art. Airbag landings are imprecise, haphazard, unpredictable, and completely dependent upon safe, flat landing sites. Multiple footpad landing legs attempting to touch down on rugged surfaces are vulnerable to snagging, breakage, and could leverage the vehicle into a disastrous tip-over. The platform design substantially mitigates the uncertainty and hazards of landing on topographically diverse surfaces. As the apparatus comes into contact with an obstacle such as a boulder during descent the base reacts as a single unit as it is forced by gravity into a more stable configuration on the surface. The base also acts as a reactive interface between a possibly uneven surface and the mechanism that controls the attitude adjustments of the descending aerospace craft load. The variable surface landing platform apparatus protects the aerospace craft from the hazards encountered by the base through contact with the surface. This is accomplished largely by the function of the adjustable struts which act as interference between the base and the aerospace craft. The working mechanism of the struts consist of coil springs which are made of an extremely tough composition with a very high elastic modulus and yield strength which are powered by a reversible compound actuator with a high starting torque, adjustable torque speed, and a high load capacity. The coil spring-actuator assembly allows any vibrations and shock to the aerospace craft during touchdown to be largely eliminated and mitigated. Also, the adjustable length capacity of the nested strut assembly allows the aerospace craft to be maintained in a stable and level profile configuration. In essence, the struts function as a mechanical manipulator between the base and the securing mount. The securing mount, onto which the aerospace craft is coupled, also functions as the interface with the control electronics unit (CEU) or aerospace craft main computer which ultimately controls the function of the landing platform apparatus. The reaction of the apparatus to surface conditions at touchdown is initiated by pressure sensors situated circumferentially around the base. Upon basal contact at the initial contact point, the juxtaposed sensor signals the CEU to activate the attitude determination and control system (ADCS) which commands the strut(s) in the immediate vicinity of the initial contact point. This reaction allows the coil spring-actuator assembly mechanism to channel the kinetic energy of impact and the descent momentum of the aerospace craft load mass into a controlled, managed transformation energy embodied in the actuator-controlled compression of the coil springs (elastic force dynamics). This energy is largely dissipated into the landing surface via the base as the base settles onto the landing surface as the remaining struts are engaged in a bilateral circumferential sequence of retraction around the basal structure. The coordination of the strut sequence is controlled by the CEU gyro-stabilization program of which the ultimate function is to maintain the aerospace craft in a stable horizontal attitude. The end result of the procedure is to position the aerospace craft load as low to the surface and as far upslope as the mechanism and the topography will allow. All electronic and mechanical operations are powered by the power subsystem of the aerospace craft. Objectives include, but are not limited to, the illustration of the following: 1) a landing platform with a means to safely settle an aerospace craft onto a variable terrain; 2) a means of operating the landing platform in response to different contingencies; 3) a means of manufacturing a landing platform, and; 4) a special composition of materials that provide the strength and durability for use as a functional touchdown mechanism. Furthermore, it is an objective of this application to illustrate the preferred embodiments and broadly state the methodologies that may be used to land an aerospace craft in a variety of topographical environments.

In one embodiment, a variable surface landing platform (VARSLAP) includes a base for contacting a landing surface; at least 3 adjustable struts interconnected with the base, wherein each strut is bisected by a strut actuator-housing, and wherein the at least 3 adjustable struts are interconnected to a main body aerospace craft (MAC); a sensor array on the base; and an attitude determination and control system (ADCS). In one alternative the adjustable struts have a first position and a second position, the first position being a retracted position and the second position being an extended position. Alternatively, the base is a rigid-body constructed in a configuration to mitigate a variety of contingent strut and topographical environs. Alternatively, the base is a hollow, circular ring with a convex undersurface. In one alternative, the ADCS controls the at least three struts, the ADCS receiving an indication that a first arc of the base and the associated one or two of the at least three struts has contacted the landing surface, fully contracting the first one or two of the at least three struts, maintaining the MAC in an orientation perpendicular to a gravitational vector by adjusting the at least three struts until the MAC is at rest. In another alternative, the VARSLAP further includes a movable transition joint oriented between each of the structural support components of the VARSLAP. In one alternative, the movable transition joint has three-dimensional freedom of movement. In yet another alternative, the adjustable struts house a coil spring. Alternatively, the adjustable struts house a first and second coil springs. In another alternative, the first coil spring is attached to a first side of a revolving disk located in each of the at least 3 struts and the second coil spring is attached to a second side of the revolving disk. In yet another alternative, the revolving disk has a first and second position, in the first position the first and second coil springs are fully extended due to deflection caused by the rotation of the revolving disk, and in the second position the first and second coil springs are retracted.

In one embodiment, a method of positioning a load on a surface includes contacting the surface with a landing body; initiating a disjunctive planar dynamic between the surface and the load, wherein the load is interconnected with the landing body; and bringing the load to rest. In one alternative, the load is interconnected with the landing body via at least 3 adjustable struts. In another alternative, the method further includes the sensing the contacting with a sensor corresponding to a first one or two of the at least 3 adjustable struts; and contracting the first one or two of the at least 3 adjustable struts. In yet another alternative, the method further includes maintaining the load perpendicular to a gravitational vector by adjusting the at least three adjustable struts until the load is at rest.

In one embodiment, a strut, for use with a landing platform for a load, includes an extendable outer strut body having a hollow center; a first and second spring; and plate oriented inside the hollow center the first spring attached to a first side of the plate, the second spring attached to the second side of the plate, wherein the first and second spring are anchored at the ends of the strut, such that turning of the plate applies a torque to the first and second spring and thereby extends the spring and the strut. In one alternative, an actuator located in the hollow center performs the turning of the plate. In another alternative, the actuator has an involute torsion-lock. Alternatively, the involute torsion-lock includes a solenoid that locks the strut in place. In one alternative, at least one sensor is associated with the strut.

BRIEF DESCRIPTION OF THE DRAWINGS

FIG. 22 is a side view of the strut exo-structure in relation to the fully extended internal coil spring.

FIG. 23 is a side view of the strut exo-structure in relation to the fully compressed internal coil spring.

FIG. 33 is a perspective view of the nested cable column.

FIG. 34 is a cross-sectional view of the nested cable column.

DETAILED DESCRIPTION

Scope:

One embodiment of the VARSLAP includes a smart structure of modular design that, by use of pressure sensing, microprocessor technology, and modern control theory, facilitates safe electromechanical control-structure interaction with the landing surface. Because the VARSLAP is ancillary to the aerospace craft, the latter, as a means of distinguishing it from the present landing apparatus, will hereafter be referred to as the main-body aerospace craft (MAC). Although the VARSLAP presented in this application is described and shown as detachable from the MAC, this presentation in no way, manner, of form precludes the two structures (i.e., the VARSLAP and the MAC) being integrated as one single structure during manufacture and assembly. Both forms are contemplated herein. Although the VARSLAP is presented primarily as a mechanism to facilitate extra-terrestrial exploration, the use of the apparatus is not precluded from terrestrial applications as well.

Figure 1:
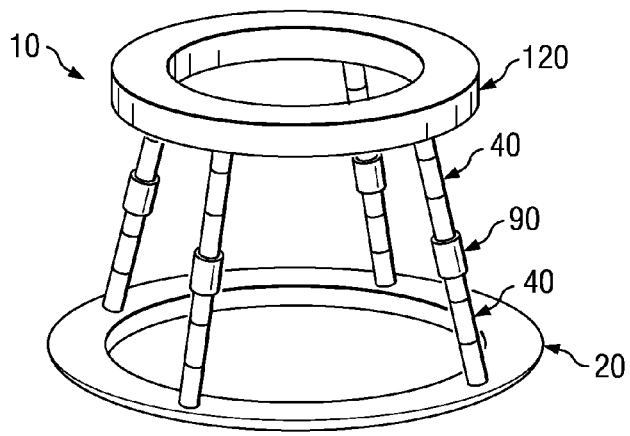
FIG. 1 is a side perspective view of one embodiment of a VARSLAP showing the configuration at final pre-touchdown stage.
Figure 2:
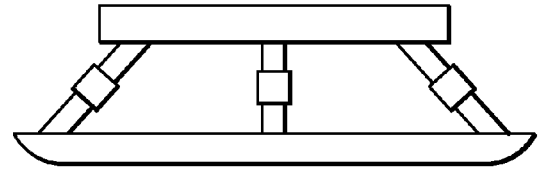
FIG. 2 is a side perspective view of the VARSLAP of FIG. 1 showing the configuration at post-touchdown stage on a level surface.
Figure 3:
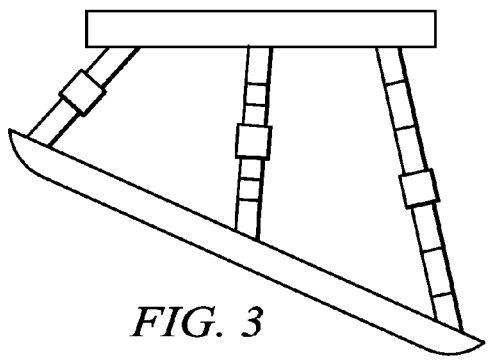
FIG. 3 is a side perspective view of the VARSLAP of FIG. 1 showing the configuration at post-touchdown stage on a sloped surface.
Figure 4:
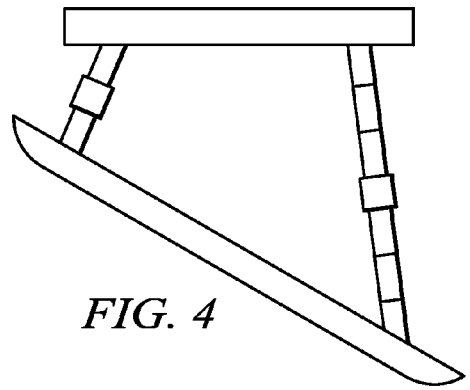
FIG. 4 is a ¼ turn side perspective view of the VARSLAP of FIG. 1 showing the configuration at post-touchdown stage on a sloped surface.

Profile:

In FIG. 1, an embodiment of a VARSLAP 10 has a base 20 onto which are attached at the lower end a minimum of three (four shown) adjustable struts 40 each of which are bisected by a strut actuator-housing 90 and at the upper end each of which are attached to a MAC mount 120. In FIG. 1, the VARSLAP 10 is shown in the fully deployed mode whereby the struts 40 are maximally extended as would be the case during descent prior to landing. In FIG. 2, the apparatus 10 is shown at rest in the fully retracted mode after touchdown on a flat, level surface. All struts 40 are equally retracted to the minimum possible length and the apparatus is at the lowest possible profile to the surface. In FIG. 3, the apparatus 10 is shown at rest at an angle on an imaginary inclined surface. In this depiction, one strut 40 is in the upslope position, one in the downslope position, and the remaining two (one blocked from view on far side) intermediate with and at right angles to the upslope and downslope struts 40. Also, the upslope strut 40 is in the fully retracted mode, the downslope strut 40 is in the fully extended mode, and the other two struts 40 are in the intermediate-length mode. In this situation, the upslope arc of base 20 has impacted the surface first during touchdown triggering the basal sensor array to send a locality-specific electronic signal to the ADCS which then commanded the upslope strut 40 to react by initiating a controlled retraction. The ADCS has subsequently controlled the remaining struts 40 in a manner to maintain the MAC mount 120 in a horizontal attitude as determined by the ADCS gyro-stabilization subsystem. In this depiction, the downslope strut 40 is still fully extended because, as the upslope strut 40 is fully retracted, this is the configuration required to maintain the MAC mount 120 at a stable horizontal attitude. In FIG. 4, the apparatus 10 is shown having landed on a similar slope, however, the initial touchdown point impacted a locality of arc of base 20 between the two upslope struts 40 which triggered a sensor response from that general arc location. The ADCS has responded in the same general manner except, because of the different configuration of the apparatus 10 in relation to the gradient, the upslope struts 40 were operated as a paired unit. In this case the two upslope struts 40 are retracted to minimum length and the two downslope struts 40 remain extended to maximum length in order to maintain the MAC mount at a stable horizontal attitude.

Figure 5:
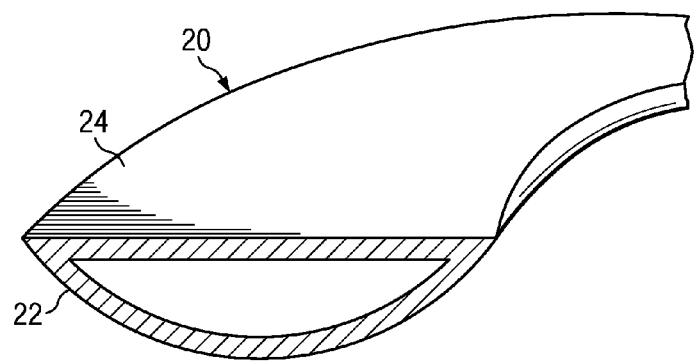
FIG. 5 is a cut away perspective view illustrating the cross-sectional structure of the base of the VARSLAP of FIG. 1.
Figure 6:
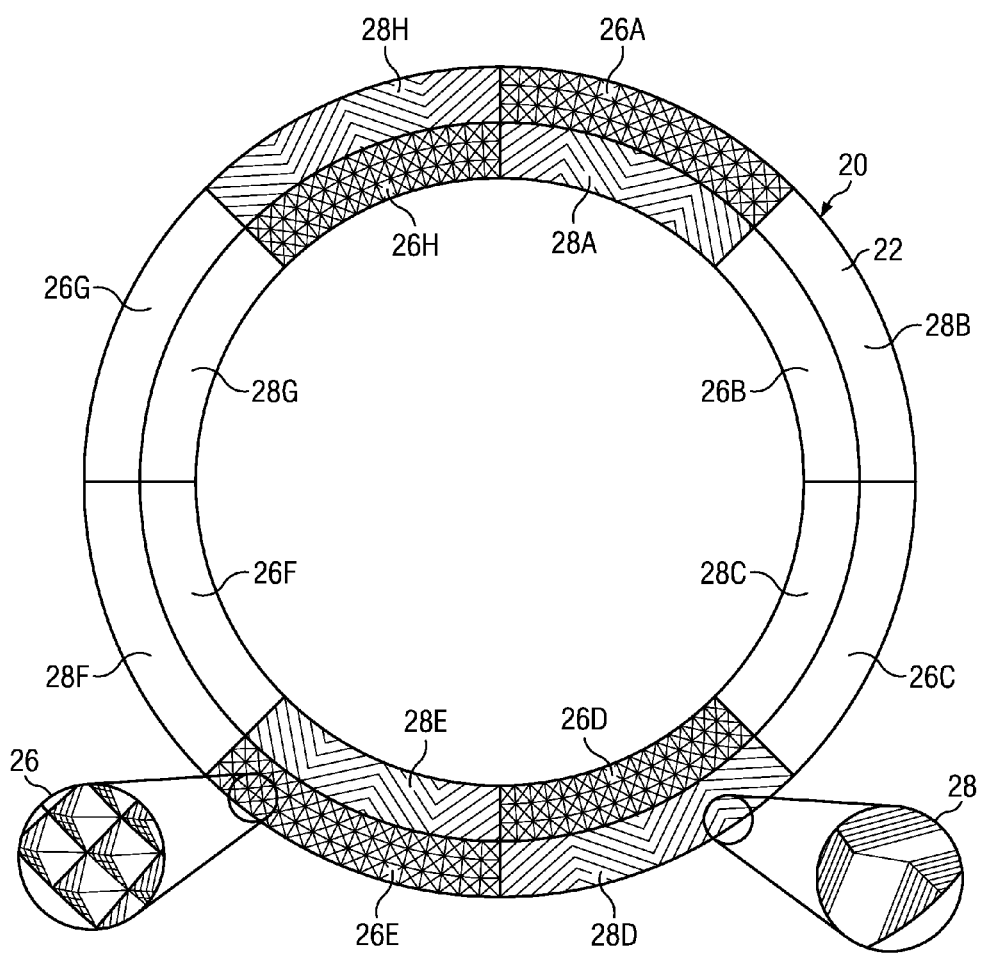
FIG. 6 is a bottom side view of the underside of the base of the VARSLAP of FIG. 1.

Base Structure:

In the course of extra-terrestrial exploration, the type of surface upon which a vehicle must land invariably consists of stone, gravel, sand, and silt material. Base 20 of the VARSLAP is a rigid-body constructed in a configuration to mitigate a variety of contingent strata and topographical environs. In FIG. 5, base 20 is comprised of a hollow, circular ring with a convex undersurface 22 and an uppersurface 24 whereby the curved shape of undersurface 22 is formed to impede linear movement along an inclined gradient of base 20 by maximizing surface contact and friction of the base with shallow topographic irregularities such as bumps, dips, and ridges. In some alternatives the convex shape of undersurface 22 also tends to bunch up loose material thereby functioning as a brake to such downslope movement. In the pursuit of a superior landing gear, the very contact-surface of the gear with the substrate can be enhanced. For example, pointed projections, such as cleats found on mountaineering boots, when under a gravitational load are known to impart a point-pressure traction on hard, rocky surfaces, while elongated ridges, such as form the tread on tractor tires, are known to provide a channeling traction on loose, granular surfaces. These two concepts are incorporated into the structural design of base 20. In FIG. 6, a plan view of undersurface 22 of base 20 is depicted as figured into radially divided, alternating segments of pointed projections 26, which are configured to impede movement on stone surfaces, and of ridges 28, which are shaped to hinder movement on granular surfaces. A further examination of FIG. 6 reveals a radially opposing mirror-image placement of the grappling segments 26 and 28 around base 20 in a method to impart downslope movement resistance for all of the previously mentioned surface contingencies: When basal undersurface 22 is moved in any direction, grappling segments 26 and 28 are continuously situated in the diametric line of movement thus imparting a drag force along the line of movement resulting in a braking action. The convex segmented grappling undersurface pattern design is a structurally intrinsic property of base 20 and is an example of an embodiment for impeding movement along a gradient due to gravitational force. Any degree of underside curvature modification or texture reconstitution of the base for the purpose of modifying any mitigation parameters is contemplated as part of the VARSLAP. The attributes of base 20 heretofore described enable the base to embody an extemporary contact area of adherence with the landing surface while providing a stable planar surface upon which the landing platform 10 may operate. Conducive to the attributes, base 20 is composed of an extremely hard and rigid material such as aluminum-lithium alloys or metal-matrix compositions.

Figure 7:
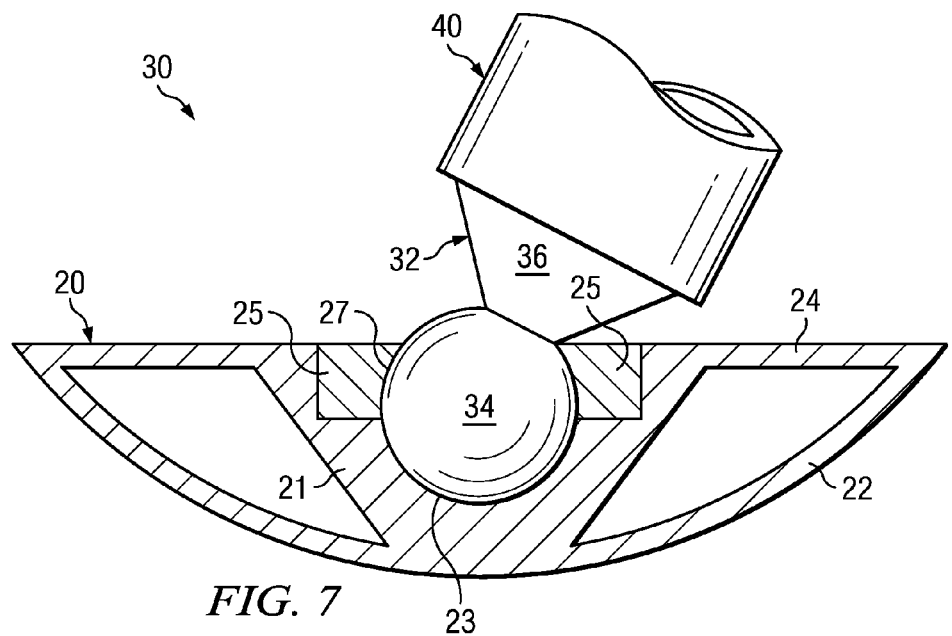
FIG. 7 is a cut away view of the base-strut elastic adjustable joint assembly.
Figure 8:
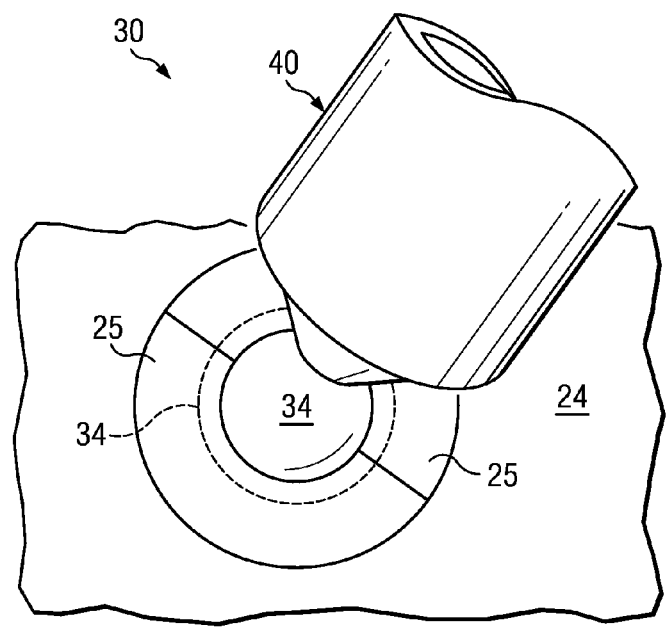
FIG. 8 is a perspective view of the base-strut elastic adjustable joint assembly.

Base-Strut Interface:

As base 20 functions as the first-contact component of the landing apparatus 10, adjustable struts 40 are the principal transition-phase mechanism between the abrupt load shift dynamic of touchdown and the final landing profile of the MAC 120. However, in order for a fluid transfer of mechanical and load force energies to occur between the disparate components of base 20 and struts 40 and, equivalently, between struts 40 and MAC mount 120, a specialized moveable transition joint connecting the components is required. Among the unique attributes of embodiments of the VARSLAP are its ability to land on sites of varying reliefs and the irrelevance of its angular position with respect to such relief. The connecting joints of apparatus 10 are the key to these attributes as they are the means by which the platform can operate with a three-dimensional freedom of movement during the landing sequence. In FIG. 7, an embodiment for accomplishing the above attributes is shown in the elastic adjustable joint (EAJ) assembly 30 which constitutes the structural coupling between base 20 and struts 40 and is represented by the interface of basal cone support structure 21 with strut 40-appendaged rocking unit 32 in a ball-in-socket arrangement which allows a 360° range of movement parameter within which the motion mechanics of base 20, struts 40, and MAC mount 120 can operate. Cone support 21 is a conic-shaped structural form of base 20 into which ball subunit 34 of rocking unit 32 is seated, specifically within socket 23 of cone support 21 the latter which provides the conduit for the transfer of load-force energy from the load-bearing struts 40 into the landing surface and also constitutes a structural load-bearing component of base 20. The structural dimensions of cone support 21 are defined by: 1) the linear distance between the inner surface of base undersurface 22 and the inner surface of base uppersurface 24; 2) the minimum diameter of cone support 21 necessary to soundly support ball subunit 34, and; 3) the minimum diameter of cone support 21 necessary to support adjustable ring plate 25 (see FIGS. 7 and 8). Adjustable ring plate 25 constitutes the fastening mechanism whereby ball subunit 34 is secured within socket 23 and may be manufactured in two halves as illustrated for installation and access removability. Ring plate 25 is adjustably attached to cone support 21 by means such as, but not limited to, mechanical fasteners, rotational locking details, or mating thread details formed between adjoining surfaces. The vertical thickness of ring plate 25 is sufficient to provide an adequate vertical curvature length of the ball 34-abutting face 27 of ring plate 25 in order to secure ball 34 within socket 23 under substantial rotational forces, while also allowing adequate inner-ring diameter clearance for the full range pivotal action of funnel subunit 36. Socket 23 and the adjoining face 27 of ring plate 25 together form a contiguous surface within which ball 34 can rotate and are precisely tooled and highly polished to form a close-fitting surface against which ball subunit 34 can slide thereby permitting the subsequent efficient pivoting action of rocking unit 32. The EAJ 30 component contributes to energy transfer at touchdown through the process of slippage damping whereby kinetic energy is dissipated by the interface friction of ball subunit 34 with socket 23 and adjoining face 27 during transient motion. Studies have shown that for a given vibration amplitude there is an optimum sliding friction force for which the damping energy is at maximum. In one configuration, an optimum force can be determined and achieved by adjusting the pressure exerted by ring plate 25 against cone support 21 thereby optimizing the pressure force of ball subunit 34 against socket 23 and, simultaneously, the pressure force of adjustable ring plate 25 against ball 34. At touchdown, the EAJ 30 reaches a limiting static friction state as ball subunit 34 is driven into rotation by shear pivotal forces acting upon rocking unit 32 which are initiated by the rigid-body inertia of base 20 and the congruent operation of strut 40 with the resultant shifting of the mass load. Due to the rotational and compression stresses generated by these dynamic loads which are subsequently channeled into its form, rocking unit 32 should be manufactured as a single structural form component of very hard, tough, and durable materials with a high compressive crushing strength. However, two mitigating factors also should be considered: 1) as a result of the intrinsic operational mechanics of the present apparatus 10, load forces are primarily transferred via a fluid transitional dynamic (as will be explicated) rather than an abrupt transmutable dynamic, and; 2) the use of the apparatus is anticipated to occur primarily in microgravity environments.

Figure 9:
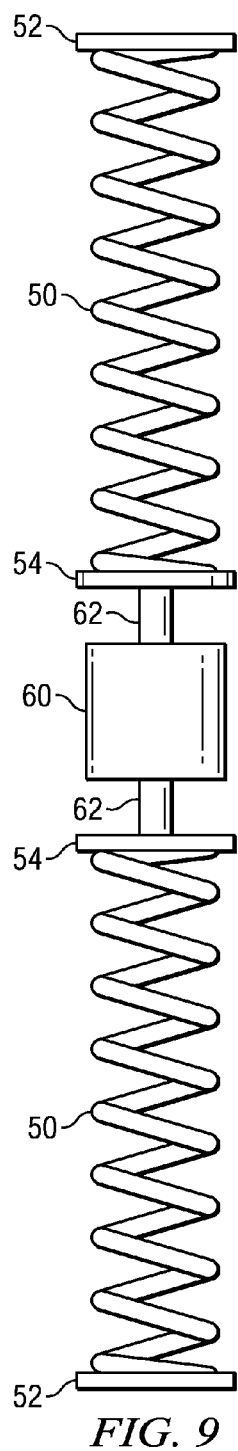
FIG. 9 is a side view highlighting the strut spring-actuator work unit.
Figure 10:
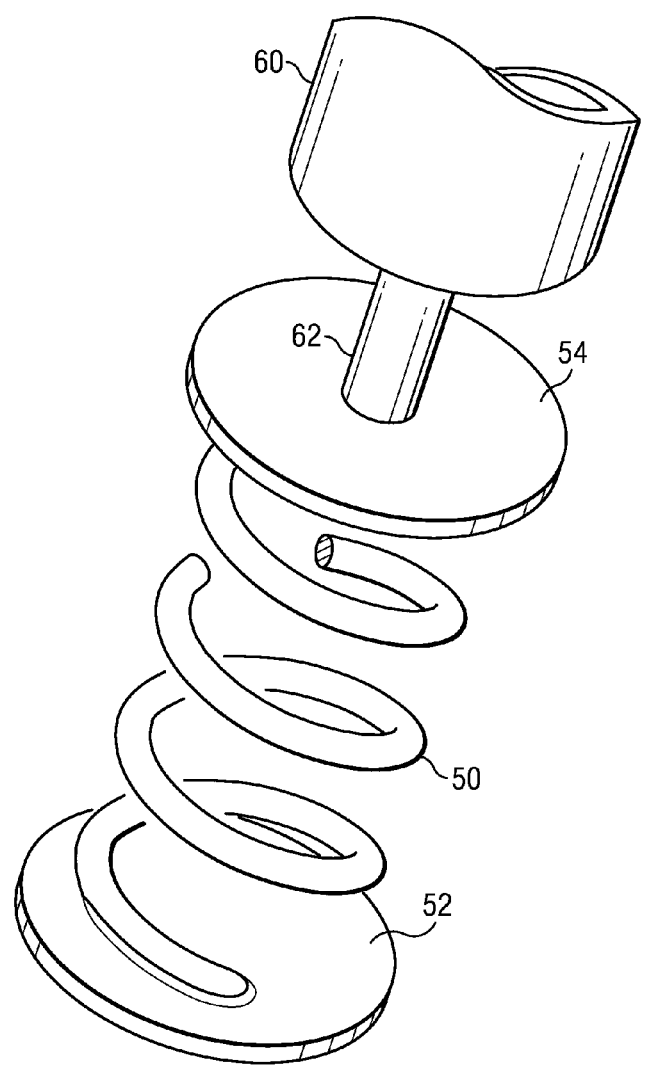
FIG. 10 is a perspective view of a strut coil spring and attached anchor disk and rotating disk.
Figure 11:
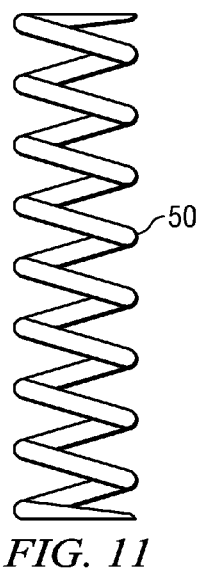
FIG. 11 is a side perspective view of a strut coil spring in the neutral deflection stage.
Figure 12:
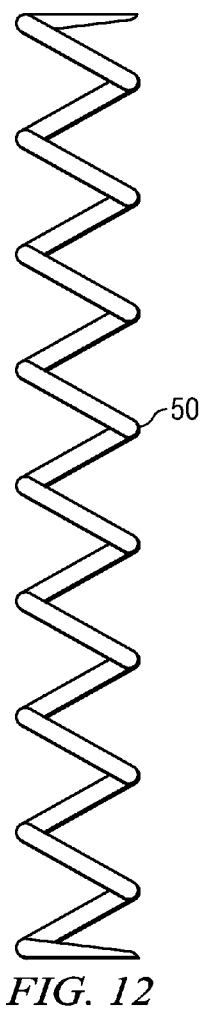
FIG. 12 is a side perspective view of a strut coil spring in the full extension deflection stage.
Figure 13:
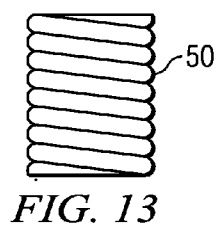
FIG. 13 is a side perspective view of a strut coil spring in the full compression deflection stage.

Strut Coil Springs:

In embodiments of the VARSLAP, coil springs are an embodiment for the purpose of obtaining a maximum linear extension from a minimum starting length. Strut operation is governed by a spring-actuator work unit (SAWU) which constitutes the internal mechanism of strut dynamics. In FIG. 9, the SAWU is illustrated with each strut 40 being equipped with two coil springs 50 one of which extends from base 20 upward to actuator 60 which is situated midway along strut 40, and the other which extends from actuator 60 up to MAC mount 120, with both springs 50 functioning in the same manner but in a reciprocal action of opposite directional force. In FIG. 10, each spring 50 is an open-wound helical wire with squared and ground ends allowing the level attachment of one end to anchor disk 52 which, being affixed to funnel subunit 36 and to the distal end of strut 40, renders the attached end stationary, while the opposite end of the spring is attached to revolving disk 54 which, being a dynamic component of the rotor shaft 62 of actuator 60, imparts a torque to spring 50 via the torque force generated by actuator 60 and transmitted to revolving disk 54. In some embodiments of the VARSLAP, the coil springs 50 function as the slave to the actuator 60 which governs the operation of the SAWU by manipulating the deflection of the springs 50. The specially designed springs 50 of the present apparatus 10 are required to perform the functions of torsion, compression, and extension within a single full-length deflection and are therefore designated as three-phase springs. In FIG. 11, a spring 50 is shown in the rest or neutral configuration of manufacture in which configured state no external imposed force is extant. The rotary action of actuator 60 induces an angular deflection in spring 50 which in turn imparts a linear, directional action or torque to the spring. In FIG. 12, spring 50 is shown in the transfigured full extension deflection stage of stored torsion energy as a result of kinetic torque energy supplied by actuator 60 prior to touchdown. This transfiguration of deflection of spring 50 by the rotary action of actuator 60 in some embodiments of the VARSLAP assists with the landing. During touchdown, actuator 60 manipulates spring 50 (FIG. 12)

in a manner to allow the controlled release of the torsion energy through to the neutral deflection stage (FIG. 11) and, again requiring input energy from actuator 60, into the transfigured compression stage and terminating at the full compression solid height stage shown in FIG. 13. The singular full-length deflection action of spring 50 and the resultant transfiguration energy utilized for work constitutes the spring-contributed load-bearing and management mechanism by which the SAWU manipulates the MAC load. Because torsion is deflection within the elastic range of a spring due to twisting, the constituent metal alloy of the three-phase spring 50 of apparatus 10 will exhibit an advanced degree of elasticity entailing sufficient torsion and tensile strength (stiffness), hardness, toughness, and temperature range tolerance for proper function and stress resistance. In one alternative, constituent materials having a low or zero thermoelastic coefficient, thus eliminating variations in the stiffness of springs caused by changes in modulus values due to temperature differentials, and which exert uniform loads and deflections throughout the elastic range of a spring are called constant-modulus alloys. New design specifications for the development of the three-phase coil spring of the landing apparatus 10 are in accordance with well established parameters observed and implemented by the spring technology industries and are presented to incorporate with present knowledge in order to formulate a related, coherent function.

Figure 14:
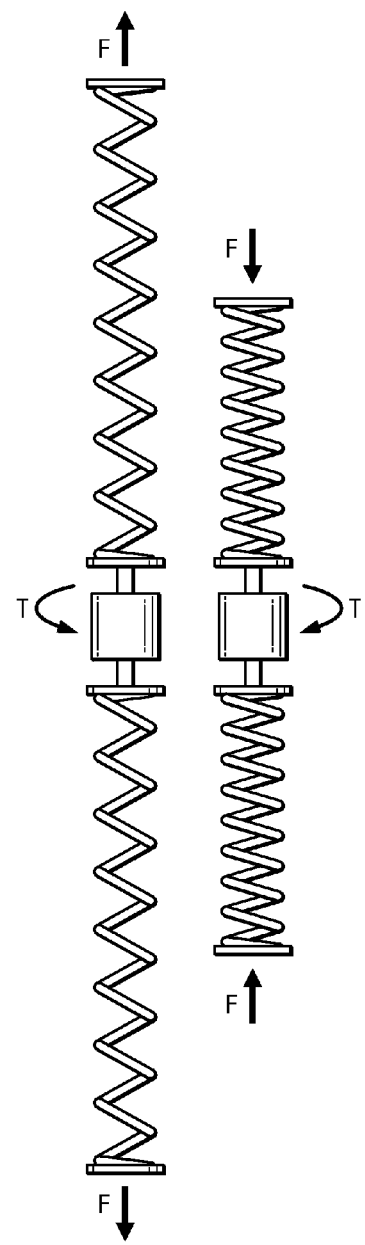
FIG. 14 is a side view demonstrating the electrodeflection mechanical action.
Figure 15:
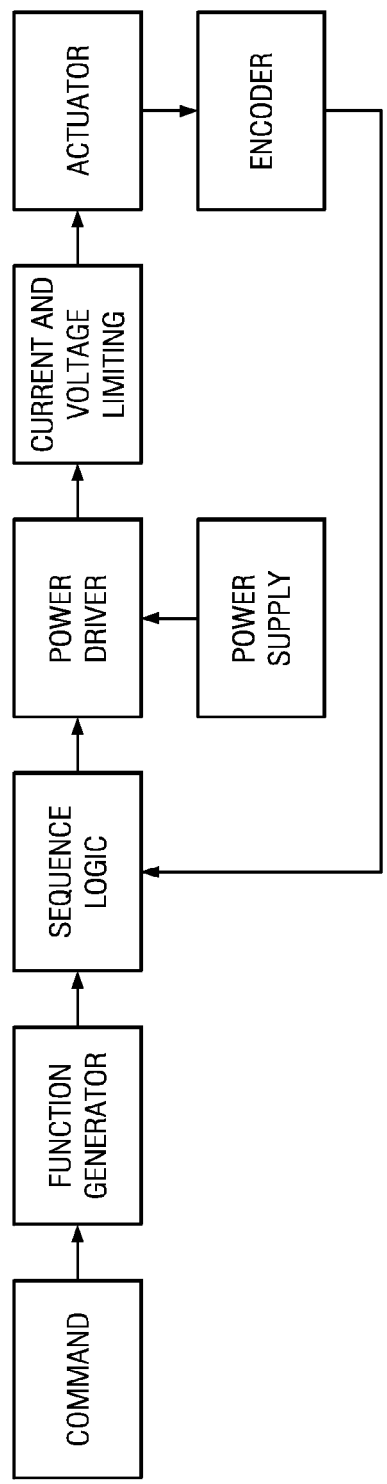
FIG. 15 is a flow chart showing the command structure of the power subsystem.

Actuator Function:

The motive power delivery component of the SAWU is the electric-powered rotary actuator 60 which derives bus voltage from the MAC power subsystem. Actuator 60 is of a structurally bi-symmetrical design (see FIG. 9) resulting in a dual-output power function with rotor shaft 62 extending through the length of the frame of the actuator and fastened at either end to revolving disks 54 each of which in turn are affixed to coil springs 50 wherein an electrodeflective mechanical system is established. In FIG. 14, the electrodeflective mechanical action occurs as follows: An electrical current induces torque T within actuator 60 which transfers the torque via bilateral output shaft 62 to attached bilaterally opposed coil springs 50 which react with a deflection manifest by linear motion force F away (extension force or torque) from or toward (compression force or torque) actuator 60 depending on the direction of torque imposed upon the springs by the rotary direction of actuator 60. The configuration of the platform apparatus 10 is manipulated by commanding actuator 60 to rotate in one direction, resulting in the linear displacement of actuator 60 away from MAC mount 120 by the extension action of the spring 50 which connects MAC mount 120 with actuator 60 and, simultaneously, the linear displacement of base 20 away from actuator 60 by the extension of the spring 50 which connects base 20 with actuator 60. A reversal of rotation of actuator 60 results in a subsequent reversal of the above operational motion. Designed within the equivalent circuit of actuator 60 are special dynamic properties including sudden speed and torque increase ability, high horse power, and high torque capacity including excitation, pullover, and holding torques which, through the manipulation of the torque-speed curve, allow the efficient management of the coil springs 50 and the conjoined MAC mount and attached MAC load. In FIG. 15, a block diagram of a control system for actuator 60 is shown. The operation of actuator 60 is under direct microprocessor control of the CEU central processing unit whereby various procedural sequences are executed via a variable voltage input program which translates to command power control through a voltage excitation and suppression circuitry. Actuator 60 is limited in the amount of rotation in either direction by means of limit switch circuitry which corresponds to the maximum compression and extension stages of the coil springs 50 and the un-deflected midway stage between the limits is registered by a corresponding circuit position switch. The deflection stage along the compression-extension continuum is tracked within the CEU via a rotor angular position encoder and the digitally processed deflection stage constitutes the input data with which the CEU algorithmically modulates the output voltage-supply frequency ratio which controls actuator 60. More specifically, at touchdown the pulse rate control command function executes an accurate angular velocity and displacement control sequence directing actuator 60 to increase the deceleration of the inertial MAC load resulting in an optimum mechanical impedance control rate of the MAC load. A time-modulated high voltage is applied to the windings of actuator 60 at the initiation of the sequence causing rapid acceleration with a maximum of low frequency torque thereby allowing extended springs 50 to rapidly initiate compression at the instant the MAC load inertial force impacts spring 50. Torsion energy within springs 50 is transformed into kinetic energy while simultaneously allowing MAC load inertial energy to dissipate along the same pathway whereupon actuator 60 gains control of the MAC load (in essence, the actuator "catches" the load). Commensurate with the tendency of the torque load of deflecting spring 50 to race actuator 60, an electronic braking procedure is activated whereby a CEU-induced decline in excitation voltage to actuator 60 causes a consequent decrease in angular velocity, spring 50 deflection velocity, and MAC load descent velocity as actuator 60 maintains a high controlling torque. As the neutral spring stage is reached, the midway position switch signals the commencement of a gradual CEU-induced increase in excitation voltage and resultant torque which initiates and executes the compression stage of spring 50 in which deflection progresses until the compression limit switch is activated whereupon actuator 60 rotary function is halted. A variety of motor types in use today, including the brushless dc motor favored by the aerospace industries, can be designed to offer the specifications required to display the operating parameters discussed above. However, the modes of operation and required modifications needed to perform the functions embodied within the operational scope of embodiments of the VARSLAP, and any variations on the theme and methodologies of accomplishing the same or similar deflection procedure would occur to those skilled in the art in light of this disclosure. The fluid dynamics characteristics inherent in the power sequence function described herein by necessity impose upon actuator 60 a largely continuous operational demand outside the parameters of optimum rated speeds and torque loads. In one alternative, in order to maximize the operational efficiency of the SAWU, a Fuzzy Logic Motor Control program integrated within the power drive logic of the CEU controlling the landing platform 10 is used.

Figure 16:
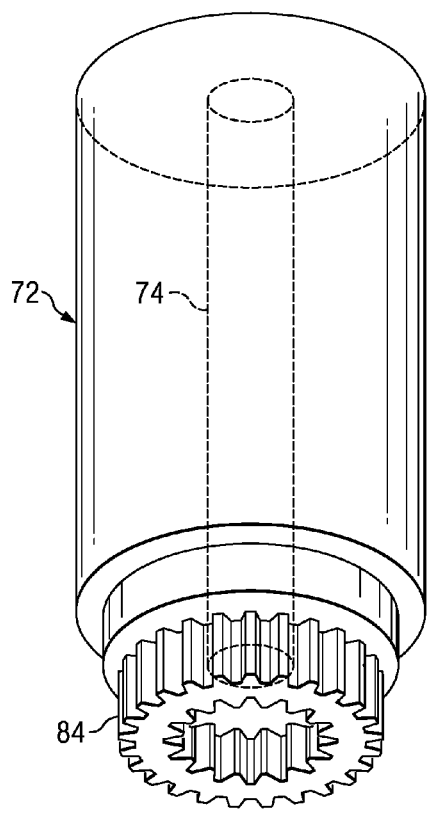
FIG. 16 is a perspective view of the bored tubular solenoid.
Figure 17:
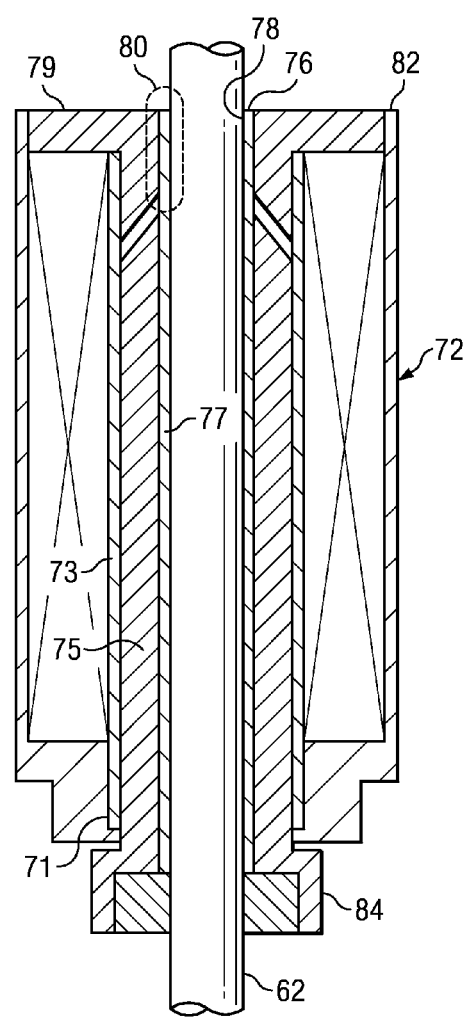
FIG. 17 is a cross-sectional view of the bored tubular solenoid.

Torsion-Lock Mechanism:

Actuator 60 operates as an intermittent-duty motor with a direct mechanism-load linkage designed for maximum response efficiency and load control with minimum mechanical complexity. A means of disengaging the actuator from the substantial torque load of springs 50 is accomplished by an involute torsion-lock (ITL) mechanism 70 whereby the action of the mechanism exerts a linear force about the axial lever of rotor shaft 62 resulting in the torque force load being blocked, locked into place, and dynamically, though not structurally, disengaged from actuator 60 when the actuator is de-energized. In one embodiment for the actuating component of the ITL 70 is represented by a linear tubular solenoid of the general type which is designed to offer a high volumetric efficiency of operation and is a variation of the type specified for industrial and military/aerospace equipment where space permitted for its installation is restricted. In FIG. 16, the linear tubular solenoid is shown. The bored linear tubular solenoid 72 is designed to be situated in a circumferential configuration around rotor shaft 62 by means of a rotor conduit bore cavity 74 through which rotor shaft 62 extends. In FIG. 17, an internal view of solenoid 72 reveals bore sleeve 76 traversing the longitudinal length of solenoid 72 and thereby delineating cavity 74 and serving as a partition between the internal structure of solenoid 72 and rotor shaft 62 while also providing an un-abutted conduit along the inner surface 78 of bore sleeve 76 within which rotor shaft 62 can freely rotate. Bore sleeve 76, being constructed to perform a similar function as the bobbin 71 (as known to those skilled in the art) which defines the aperture that slideably receives the outer surface 73 of movable core segment 75, abuts the inner bored surface 77 of movable core segment 75 and constitutes the rail that slideably receives the inner bored surface 77 of moveable core segment 75 during the linear action of solenoid 72. Bore sleeve 76 is of rigid construction and is structurally fixed within the aperture of fixed core 79 along area 80 where it terminates at surface 82 of solenoid 72 which faces actuator 60. The magnetically-induced linear operation of bored linear tubular solenoid 72 in other respects is designed to operate in a manner comparable to that of the linear tubular solenoid.

Figure 18:
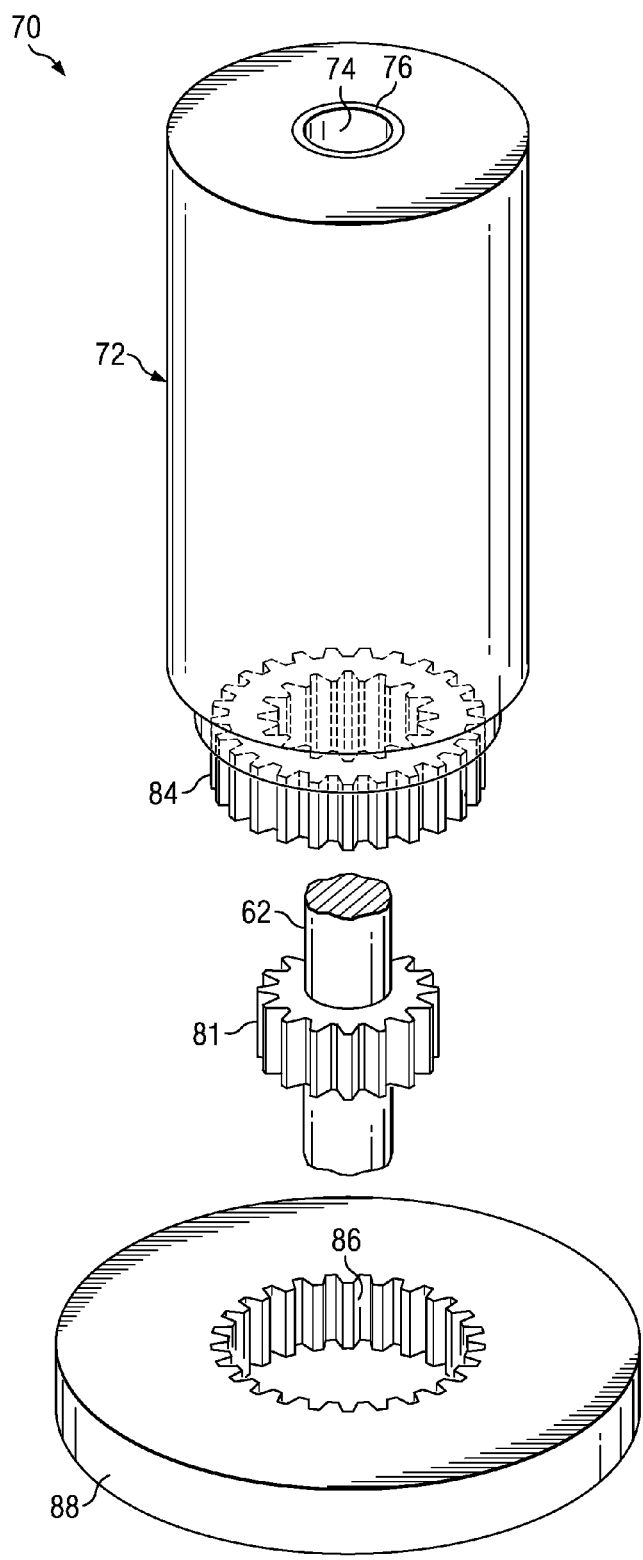
FIG. 18 is an exploded perspective view of the involute torsion-lock mechanism.

In FIG. 18, the working relationship between the interlocking components of the ITL mechanism 70 is shown. The lower interfacing end of moveable core segment 75 (see FIG. 17) is modified into a splined lock plunger 84 (see FIGS. 16, 17, and 18) of ring-shaped form and possessed of internal- and external-facing spur gear structures or teeth that, when solenoid 72 is energized, is drawn out of recess 86 which is formed by the juxtaposition of splined lock ring 88, being a structural component of the strut actuator-housing 90 and possessed of internal-facing spur gear structures, and splined lock disk 81, being a structural component of rotor shaft 62 and possessed of external-facing spur gear structures and which rotates within recess 86 as a the structural component of rotor shaft 62. The vertical depth of splined lock ring 88 is greater than that of splined lock disk 81 thus allowing splined lock disk 81 to be situated at the lower end of splined lock ring 88 while leaving sufficient space for splined lock plunger 84 to remain gear-locked with and in track with the upper end of splined lock ring 88 when splined lock plunger 84 is disengaged (lifted) by energized solenoid 72. When actuator 60 is de-energized causing a consequent de-energization of solenoid 72, splined lock plunger 84 is forced by spring action into the lower portion of recess 86 where the spur gear structures of plunger 84 interlock with the spur gear structures of lock disk 81 in addition to the spur gear structures of lock ring 88 with which it is already meshed. This interconnected state of spur gear structures between plunger 84, disk 81, and ring 88 within recess 86 establishes an involute torque brake wherein lock ring 88 constitutes the brake and stop by which the structure of strut actuator-housing 90 secures and fixes the angular position of rotor shaft 62, the deflection or torsion stage of coil spring 50 and, ultimately, the structural configuration of strut 40. If at the moment of de-energization the teeth of plunger 84 and disk 81 are misaligned so that immediate meshing between the components does not occur, it is expected that inertial torque creep induced in the windings of actuator 60 and transferred to rotor shaft 62 will promptly rectify the anomaly. Although in some embodiments a linear tubular solenoid is used, any mechanism utilized to accomplish the same braking function provided by the ITL mechanism 70 herein can alternatively be used.

Figure 19:
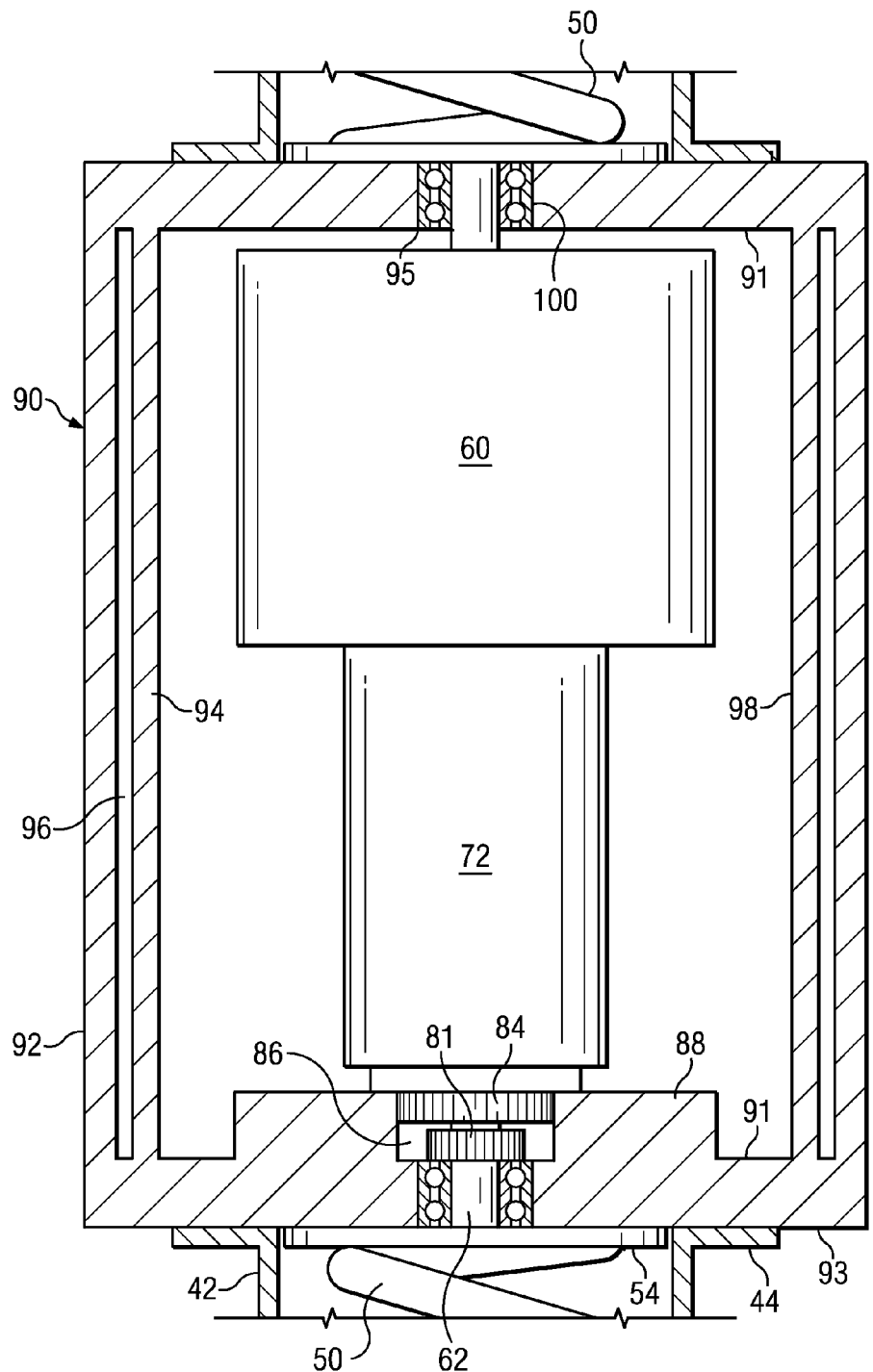
FIG. 19 is a cut away side view of the strut actuator-housing showing the internal components.

Strut Exo-structure:

The exo-structure of the strut 40 provides a strong, stiff, and dynamic shell and platform within which the SAWU can operate while, simultaneously, sharing load-bearing duty with the SAWU. In FIG. 19, the strut actuator-housing 90, which encloses and supports actuator 60 and solenoid 72, is a container of reinforced construction, being double-walled around the circumferential face with outer wall 92 and inner wall 94 together forming an open space conduit cavity 96 between the walls which encircle housing 90 and concentrically form the circumferential panel structure of housing 90. Actuator 60 and solenoid 72 which can be affixed or manufactured together as a unit are fastened to the inner face 98 of inner wall 94 as well as to lock ring 88 and the other inner faces 91 of opposing radial face walls 93 of housing 90 (fasteners not shown). The radial face walls each retain a bored opening 95 through which extends rotor shaft 62 which fastens onto rotary disks 54 at either end.

Situated between radial face bored openings 95 and rotor shaft 62 is roller bearing 100. Roller bearings, as known to those skilled in the art, are devices whose function is to support and guide a rotating shaft and which are subject to radial and axial forces resulting from such rotation. One function of bearing 100 is to allow the efficient transfer of torque from actuator 60 to springs 50 while maintaining a rigid guidance for such transfer. Roller bearings are constructed of materials possessed of high strength, good hardenability, and great toughness to withstand high local cyclic stressing at the contact points of the rolling elements with the raceways. Developments in roller bearing technology have produced a wide variety of construction materials including low alloy chromium steel, casehardening steels, heat-treated steels, stainless and high temperature steels and, for special applications, non-magnetic materials, ceramics, sintered, and plastic materials. Concurrently, extensive determinations of load carrying capacities and dimensioning of dynamic stress parameters have and are being evaluated and implemented into design. When these variables are being investigated during the stress engineering and finite-element modeling evaluations, it should be considered that the working conditions of the bearings 100 of the present apparatus 10 are stintered in comparison to those generally assumed in standard industry applications. A rolling bearing component in the mode of a double-acting thrust ball bearing is one embodiment for: 1) supporting high reversing axial forces which are too high to be transmitted by radial bearings, and; 2) providing the required rigid shaft guidance for efficient torque transfer.

Figure 20:
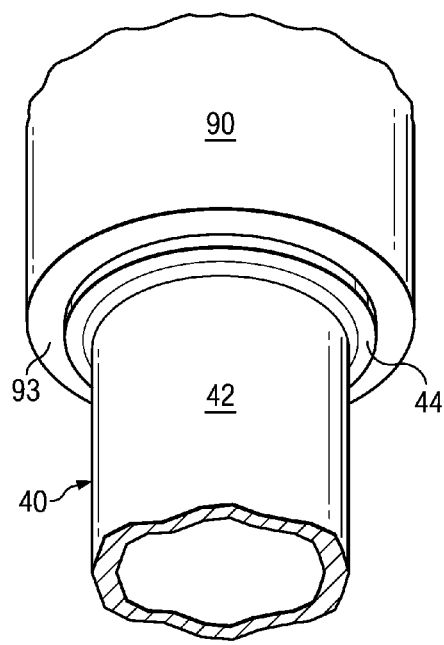
FIG. 20 is a perspective view of the juncture between the strut actuator-housing and one of the connecting strut cylinders.
Figure 21:
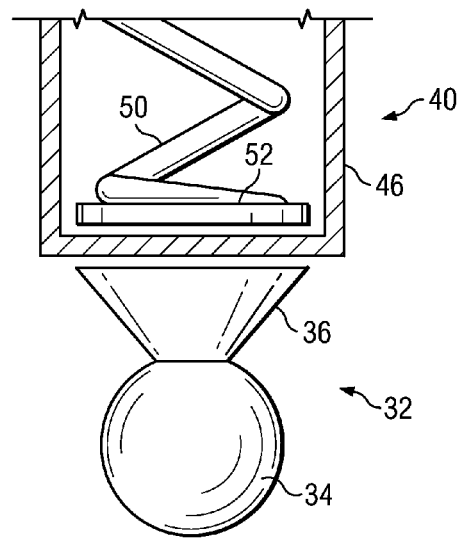
FIG. 21 is a cut away side view of the juncture between the strut cylinder, coil spring anchor disk, and the rocking unit of the elastic adjustable joint.

The coil springs 50 are enclosed within thin-walled cylinders of sufficient diameter to accommodate the greatest diameter of spring 50 which is realized at the solid height maximum compression stage (see FIG. 13) and of sufficient gauge to sustain applied axial compression, tension, and shear stresses during the operation of the apparatus 10. The cylinders are of a telescoping configuration to accommodate the linear movement of springs 50 by means of a nesting configuration which is manipulated from full extension to full contraction by the action of the SAWU. The nested cylinder design presented in the present application consists of, but is not limited to, six cylinders per strut 40, three of which are situated above strut actuator-housing 90 and three situated below the housing (see FIG. 1). With future advancements in three-phase spring technology, a greater discrepancy in lengths between the fully compressed and fully extended stages can be realized allowing possible landings onto surfaces of even greater slope gradients and a resultant requirement for more numerous cylinder components. In FIGS. 19 and 20, housing 90-abutting cylinder 42 is shown immovably mounted to radial face 93 of housing 90 at circumferential area 44. In. FIG. 21, the attachment configuration between cylinder 46, funnel subunit 36, and anchor disk 52 is illustrated where radial face 48 of cylinder 46 is stationarily sandwiched between funnel subunit 36 and anchor disk 52 thereby forming a conjoined, immobile unit among the connected components. Cylinders 42 and 46 are rigidly connected to their respective conjoined components by means such as, but not limited to, welding, mechanical fasteners, rotational locking details, or mating thread details formed between adjoining surfaces. The remaining two cylinders 41 per strut 40 are each secured between their respective attached cylinders 42 and 46 in a floating configuration allowing a sliding action among the three-cylinder unit. In FIG. 22, the flared and crimped circumferential connection 43 between the center floating cylinder 41 and the two associated fixed cylinders 42 and 46 is illustrated showing the stopped position of the cylinders during the maximum extension stage of the coil spring 50 which, congruently, corresponds to the maximum extension limit of the total strut 40 mechanism. In FIG. 23, the fully nested configuration of cylinders 42, 46, and 41 is shown in relation to the maximum compression stage of the spring 50. The SAWU and the strut 40 exo-structure working conjointly can significantly mitigate the impact of touchdown. When a spring is called upon to act only occasionally, it can be safely designed to carry a load which causes a strain nearly equal to the elastic limit of the spring. Similarly, the structural quality of a circular cylinder allows the cylinder to sustain substantial stress whereby the buckling load is also the ultimate load that can be carried by the cylinder and, as such, is determined by the gauge and the modulus of elasticity of the constituent material.

Figure 24:
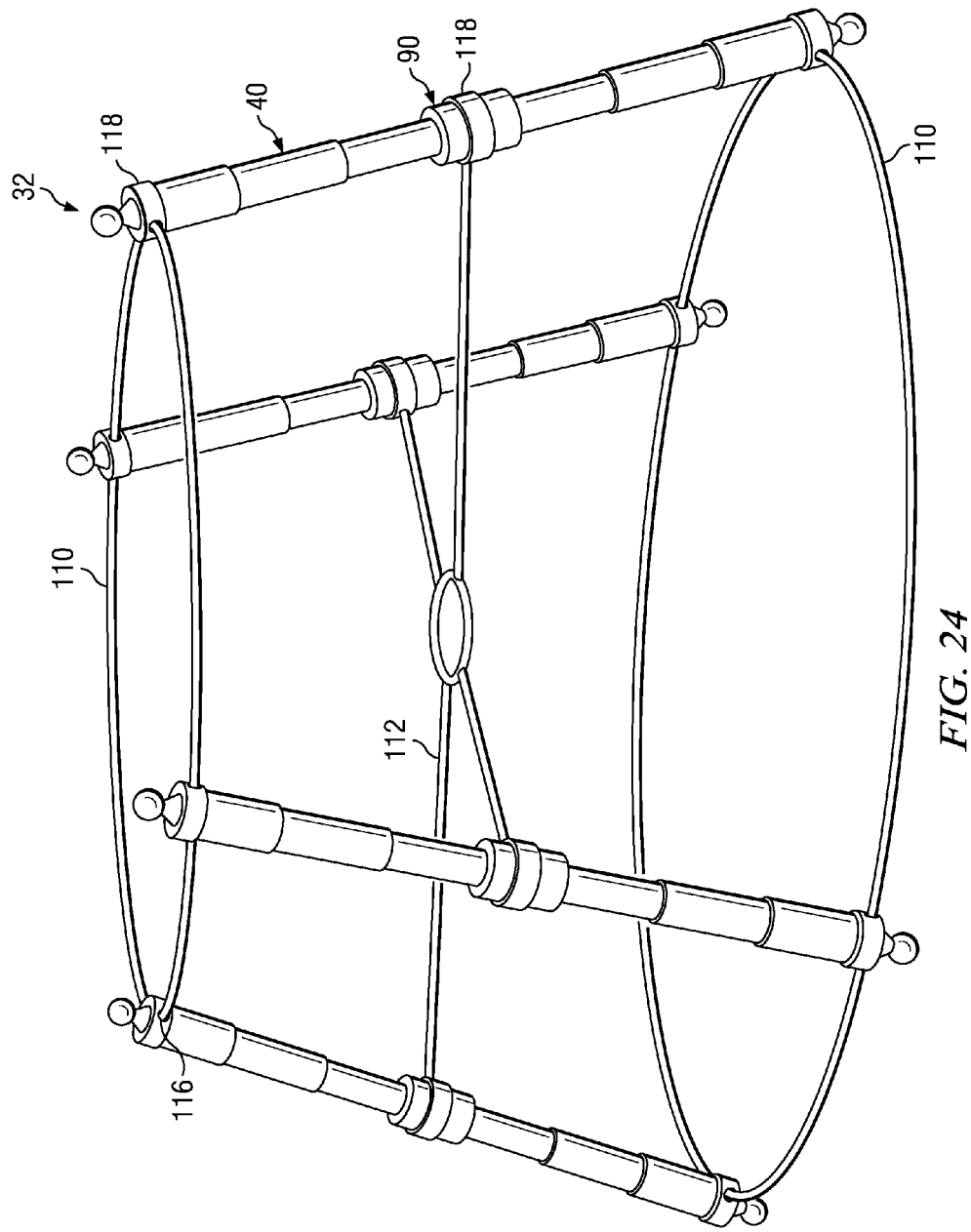
FIG. 24 is a perspective view of the dynamic frame superstructure.
Figure 25:
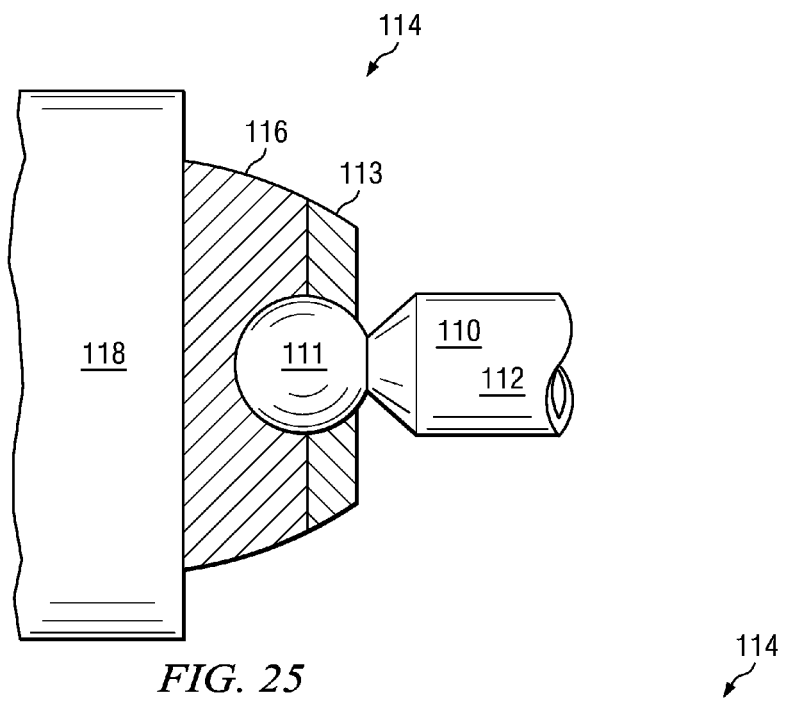
FIG. 25 is a cut away side view of the elastic adjustable joint assembly of the dynamic frame superstructure.
Figure 26:
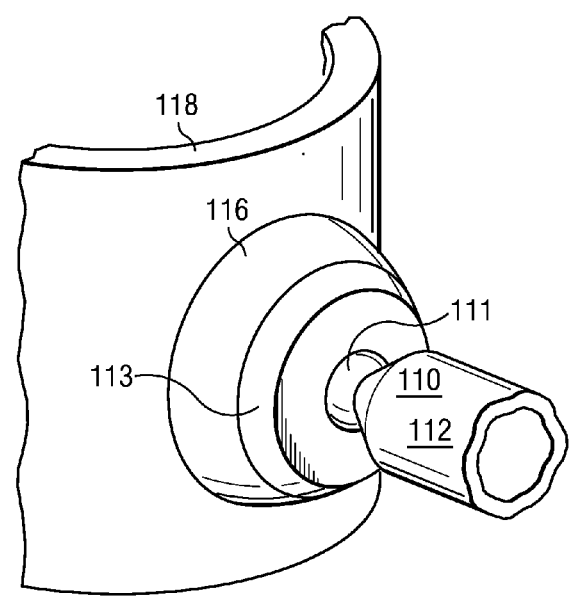
FIG. 26 is a perspective view of the elastic adjustable joint assembly of the dynamic frame superstructure.

Dynamic Frame Superstructure:

Stresses on the exo-structure of the apparatus 10 consist of top-to-bottom axial compression from the MAC load, SAWU-induced torque forces, and tension, compression, and shear loading during touchdown due to the designed stability-inducing angular configuration of the struts 40 in relation to the horizontal gravitational plane. Axial compression forces are largely managed by the SAWU. In FIG. 24, an anti-torque bar (ATB) component 110 with the primary function of mitigating SAWU-induced torque forces imposed upon the strut 40 exo-structure is shown mounted at the distal ends of the structure away from the torque-generating actuator 60 and at the specific location of anchor disk 52 where the transformation of torque force into linear force occurs. The mitigation of torque force effect at this specific distal location along strut 40 by the rotational impedance of the location permits a more efficient conversion of torque force to linear force and a subsequent enhancement of operational dynamics. An axial plane truss (APT) 112 is mounted at the central flex locale of each strut 40 corresponding to the strut actuator-housing 90 location with the primary function of mitigating strut 40 flex-movement in a direction perpendicular to the direction of the applied MAC load inertia during touchdown. In FIG. 24, the strut 40, ATB 110, and APT 112 structures combine to form a dynamic frame superstructure (DFS) embodied by an interlinking cadre of force- and load-bearing components which permit the landing apparatus 10 to effectively manage the disjointed motions of the attached base 20 and MAC mount 120. As a means to impart sufficient structural stiffness to the DFS while simultaneously allowing a functional elasticity of operation, special connecting nodes which allow the transfer and distribution of strain-energy throughout the superstructure are presented. In FIGS. 25 and 26, an elastic adjustable joint (EAJ) 114 is shown to consist of a socket node 116 into which is fitted ball unit 111 which constitutes the connecting end component of structures ATB 110 and APT 112 where the structures respectively attach to struts 40 and housing 90 as illustrated in FIG. 24. Socket node 116 is attached to struts 40 and housing 90 at ring brace 118 which also encircles and fastens to the struts and housing. Ball unit 111 is secured within socket node 116 by adjustable ring plate 113 which can be fastened onto socket node 116 by means of adjustable connectors such as, but not limited to, mechanical fasteners, rotational locking details, or mating thread details formed between adjoining surfaces. When adjustable ring plate 113 is tightened against socket node 116 thereby increasing the pressure force of ball unit 111 against socket node 116 and, simultaneously, increasing the pressure force of adjustable ring plate 113 against ball unit 111, an increased restriction of movement or sliding friction of the EAJ 114 results in an increased stiffness of the joint and, expansively, the DFS as a unit. A loosening of ring plate 113 results in a decrease in stiffness within the DFS. The manipulation of the EAJ 114 imparts a fine tuning capacity to the dynamic performance of the DFS by use of a set of stiffness and flexibility influence coefficients by causing a fluid three-dimensional force-displacement while simultaneously imposing a unified structural integrity to the unit. By correlating strain-energy distribution to load stress demands and physically manipulating the EAJ 114 to match such correlation, the DFS is designed to conform to anticipated site-specific applied force parameter contingencies including the MAC load mass, projected rate of descent (ROD) due to gravitational forces, and ambient temperature at point of touchdown, all of which can collectively affect the dynamic interplay of the constituent structural support components.

Figure 27:
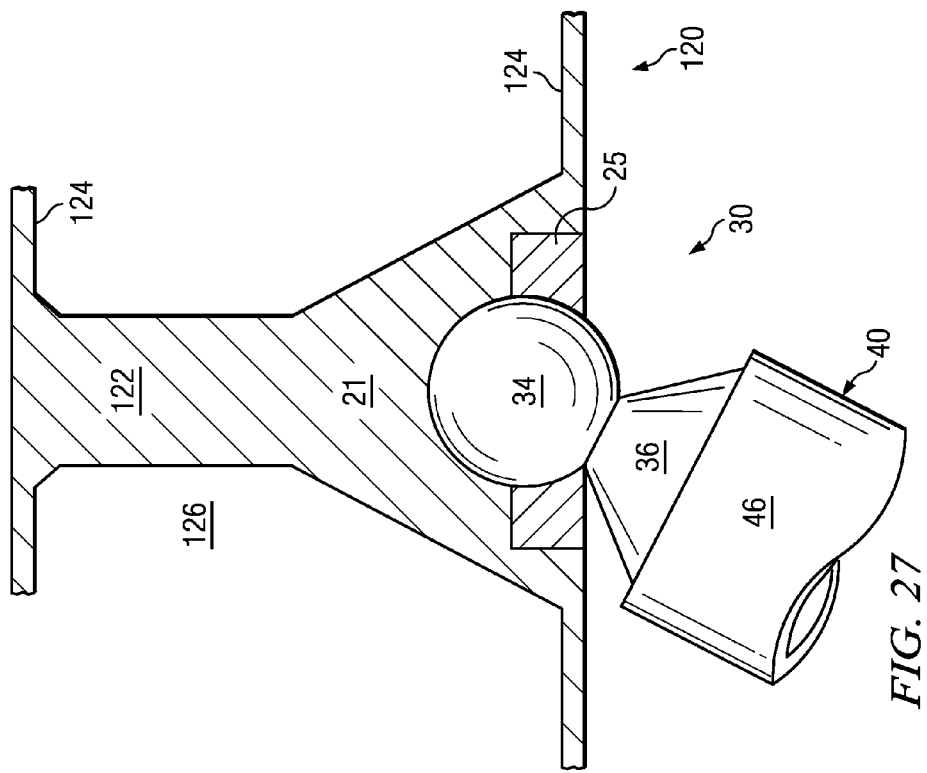
FIG. 27 is a cut away side view of the strut-MAC mount elastic adjustable joint assembly.

Strut-MAC Mount Interface:

In FIG. 27, the EAJ 30 which constitutes the structural coupling between strut 40 and the MAC mount 120 is shown with the interface of cone support structure 21 and rocking unit 32 being homologous to that described previously and whose design and function are analogous with that therein described.

MAC Mount Structure:

The MAC mount 120 (see FIG. 1) is: 1) the component onto which the aerospace craft is coupled and interfaced whereby structural and electrical interaction between the aerospace craft and the platform apparatus 10 is affected, and; 2) the lever mechanism by which the aerospace craft is manipulated by the platform apparatus 10. The MAC mount 120 presented in this application is described as a hollow ring structure with internal stiffening members and other structural load-bearing reinforcements such as, but not limited to, cone support structure 21 (see FIG. 27), various arches, beams 122, and panels, possibly of sandwich construction, all of which furnish structural wall 124 strength and distribute locally concentrated loads. The interior 126 of MAC mount 120 is designed for the placement of and access to various actuator 60-control component devices such as, but not limited to, drive controllers, amplifier assemblies, power storage units, and electrical delivery electronics.

The various structural components comprising the landing platform apparatus 10 described herein to this point in the application are subject to a variety of stresses and demands and, as such, will be designed and fabricated with the various constituent metal-matrix composites, polymer-matrix composites, aluminum-lithium alloys, and other materials that are tailored to the physical and mechanical properties required by the structural components for the proper function of the apparatus 10 as a unit.

Figure 28:
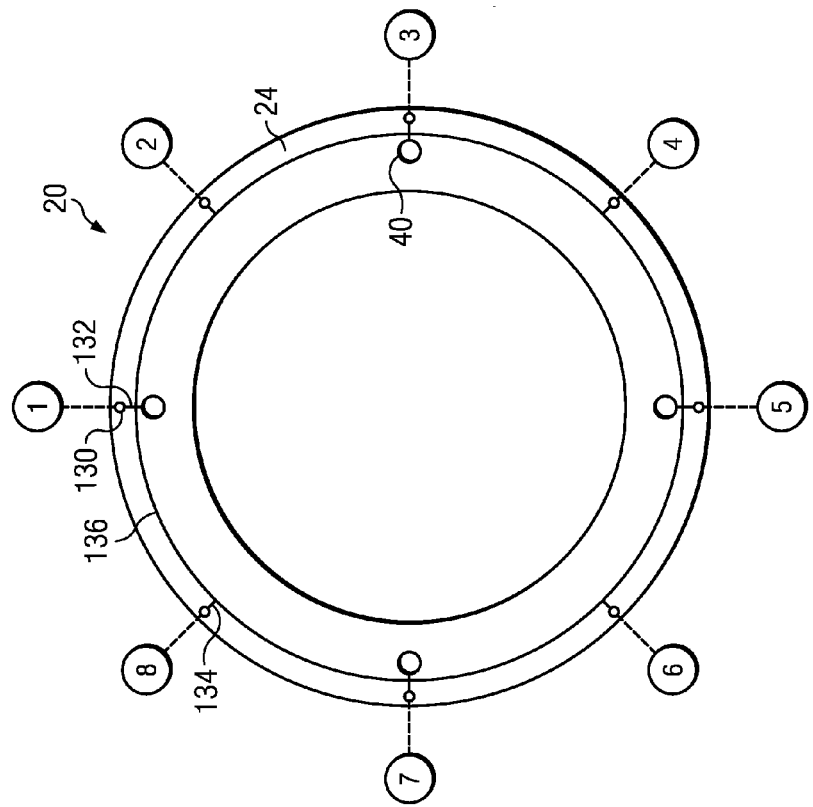
FIG. 28 is a plan schematic view of the basal sensor array.

Basal Sensor Array:

The basal sensor array (BSA) features a sensor discrimination circuit which incorporates the point of contact upon a non-level surface with the angular circumferential position of base 20 as a result of the random shock of touchdown and, accordingly, directs the destination of the resultant sensor output signal to the appropriate reactive strut(s) 40. In FIG. 28, a schematic of the BSA circuit geometry and sensor topology is presented distributed along the inner surfaces of base 20 whereby the base is radially divided into eight angular sections (as specifically applied to the particular four-strut design presented in this application), each demarcated by a sensor 130, four of which are situated at a strut 40 juncture shown as locations 1, 3, 5, and 7, and four of which are situated at a midway location between the strut 40 junctures shown as locations 2, 4, 6, and 8.

Figure 29:
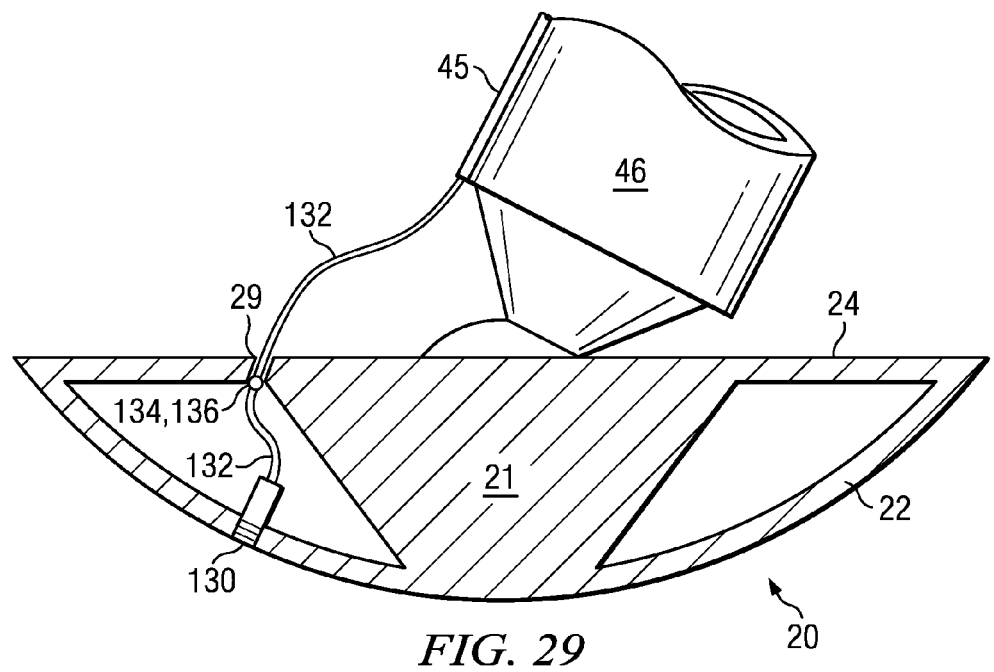
FIG. 29 is a side view of a pressure sensor mounted within the base structure.

Each sensor 130 consists of a dynamic pressure sensing transducer component such as a piezoelectric device which upon basal-surface contact and the resultant internal acceleration displacement transmits a voltage signal to the control and power electronics circuits of the actuator 60 of the most proximate strut 40 to the sensor 130. In FIG. 29, a mounting profile of a BSA sensor 130 is shown where the sensor is secured within the structure of base undersurface 22 and sensor cable 132 which conducts the signal of sensor 130 exits base 20 through cable conduit 29 which tunnels uppersurface 24 where the cable leads to the power and drive circuits of actuator 60. Juncture circuit 134 and attached transverse cable 136 (see also FIG. 28) are shown attached to the inner surface of base uppersurface 24. Sensor 130 is secured within undersurface 22 where, subject to finite-element modeling and stress engineering analysis, an optimum angular positioning along the curved surface of undersurface 22 and depth of mounting within same undersurface can be determined. For example, an optimum angular position will provide a maximum probability of direct interaction between the sensor 130 and a sloped surface and a decreased probability of direct interaction with a level surface, and a possible optimum depth of mounting within undersurface 22 with the goal of maximizing sensor 130 sensitivity while minimizing impact damage and signal distortion can cover a range of configurations including flush with the inner surface, recessed, flush with the outer surface (as depicted in FIG. 29), or beyond the outer face of underside 22 by the attachment of a supplemental sensor probe. The sensor 130 component is designed to function as a discrete, localized signal receiving and transmitting unit with certain intrinsic enabling qualities. The sensor can contain built-in microelectronic amplifying capability which converts the initial high-impedance charge into a low-impedance voltage output signal which produces a short discharge time constant allowing a defined, unambiguous pulse discharge. The sensor component is designed to be sensitive to the frequencies of an impact on various substrate conglomerates while restrictive to extraneous, non-localized vibration frequencies originating within the structure of base 20 and potentially read by sensor 130 due to coupling between the modes. Through the processes of vibration analysis and stress engineering testing the establishment of functional parameters based on the installation of adaptive filtering of signal noise, the implementation of threshold values for gauging impact locality strength, and the facilitation of random-variable acceleration can maximize the robustness of the sensor element 130 and minimize the real-time analysis of the output signal thus contributing to the efficient operation of the apparatus 10.

Figure 39A:
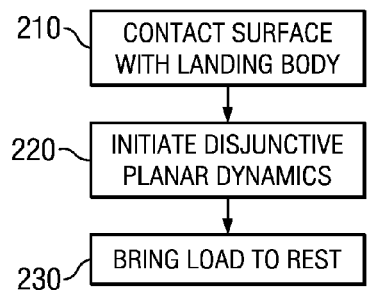
FIG. 39(*a*) and (*b*) are flow charts describing the disjunctive planar dynamic.
Figure 39B:
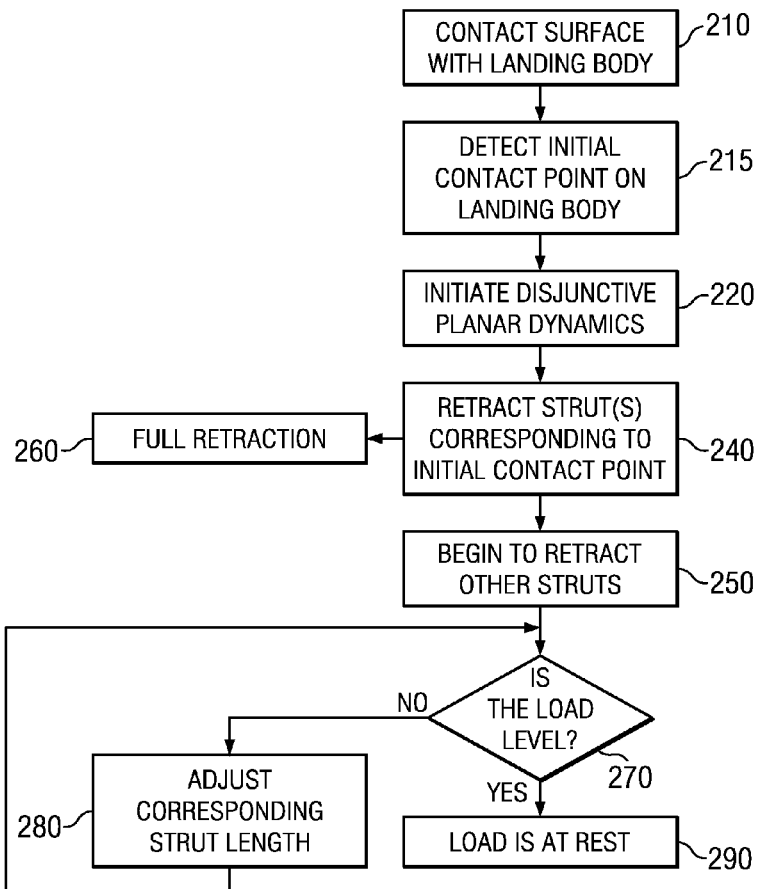

FIGS. 39*a* and 39*b* show exemplary embodiments of methods of establishing a disjunctive planar dynamic and bringing a load to rest. In the disjunctive planar dynamic process a load is positioned onto an inclined surface in a stable configuration by an interaction between a surface-cohering plane component and a load-supporting and—manipulating plane component. The latter load-supporting and—manipulating plane component facilitates the gravitational vector of the load which, in turn, reinforces the coherence of the surface-cohering component. In FIG. 39*a*, a landing body contacts a surface in step 210 and the method initiates. In step 220 a disjunctive planar dynamic is established between the load and the surface. The dynamic is adjusted until the load is at rest in step 230. FIG. 39*b* shows a more detailed sensor-initiated method of establishing a disjunctive planar dynamic and bringing a load to rest. In FIG. 39*b*, a landing body contacts a surface in step 210 and the method initiates. In step 215 the system detects the initial contact point on the landing body. In step 220 a disjunctive planar dynamic is established between the load and the surface. In step 240 the strut(s) corresponding to the initial contact point in step 215 commence a retraction. In step 250 the remaining struts start to retract in response to the platform dynamics initiated by step 240. In step 260 the struts activated in step 240 reach full retraction. In decision step 270 it is determined whether the load is level. If the load is not level, then a corresponding strut length is adjusted as calculated to level the load in step 280. When it is determined that the load is level, the load reaches a rest state in step 290.

The BSA circuit functions as follows: Referring to FIG. 28, a strut 40 juncture-situated sensor 130 when activated transmits a signal to the control circuits of the proximate actuator 60 via sensor cable 132. At the instant a signal is transmitted the circuit becomes un-reactive to any further signal input (i.e., only the first sensor 130 output is processed). A midway-situated sensor 130 when activated transmits a signal simultaneously to the control circuits of the actuators 60 of the two proximate struts 40 between which the midway-situated sensor 130 is located via transverse cable 136. The switching circuits 134 at junctures 1, 3, 5, and 7 are each designed to receive signal conductance from the associated local sensor 130 and also simultaneously from the two either-side adjacent sensors 130 (i.e., 8 and 2, 2 and 4, 4 and 6, or 6 and 8) and allow transmission of the signal to the control circuits of the actuator 60 of the junctures 1, 3, 5, and 7, while blocking conductance from the associated local sensor out of juncture circuit 134. The switching circuits 134 at midway junctures 2, 4, 6, and 8 are each designed to provide signal conductance from the associated local sensor 130 at the junctures simultaneously to the two either-side adjacent sensors 130 (i.e., 1 and 3, 3 and 5, 5 and 7, or 7 and 1). For example, a firing of sensor 130 at location 1 will activate only its associated actuator 60 as the signal voltage will be blocked from conveying out of the circuit along transverse cable 136. A firing of sensor 130 at location 2 will be conveyed to locations 1 and 3 via transverse cable 136 but will be blocked from continued conveyance beyond locations 1 and 3 along transverse cable 136. The transmitted signal(s) activate a control switch in the actuator 60 servo-amplifier circuit (see section [0059]) which disconnects the actuator(s) from its associated synchro-control transmitter circuit, an action which automatically triggers the immediate-response operation of the signaled actuator(s) 60 which, with no error-detector circuit to direct the actuator(s), operate(s) in an independent, preprogrammed manner at touchdown as described in the actuator function section[0046] of this application.

Figure 32:
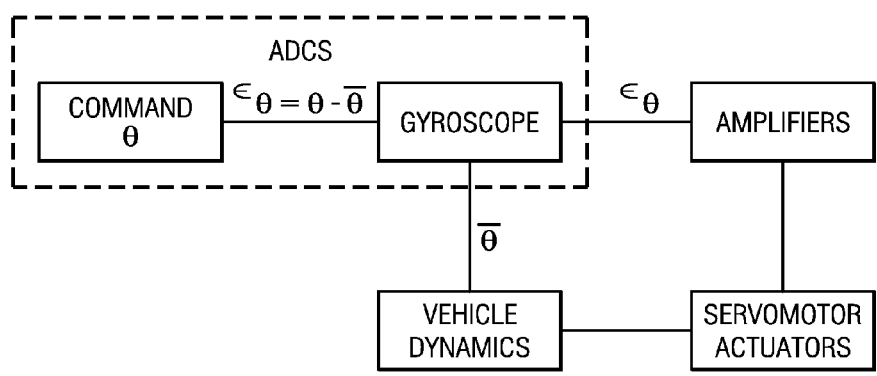
FIG. 32 is a flow chart showing the servomechanism control command.

ADCS Servo Control:

Each actuator 60 is a servomotor connected to a servo-mechanism system based on platform-stabilization technology developed for the operation of automatic flight control systems whereby the aerospace craft is controlled by a gyroscope with respect to a fixed reference frame and the relative positioning of the gyroscope. The dynamics of the landing platform 10 is controlled by the ADCS which uses local gravity as a horizontal fixed reference and embodies a synergistic interaction between the MAC gyroscope, being the reactor to the dynamics of the MAC (along with the attached MAC mount), and the CEU microprocessor pulse rate control command for actuator 60, being the forcer of the dynamics of the MAC. Upon the initiation of platform dynamics caused by the firing of sensor 130, the angular coordinate of which is logged within the CEU, a platform-stabilization algorithm is initiated within the control processor which, in geometric relation to the sensor 130-activated strut(s) 40, maintains a reactive dynamic of the horizontal mode based on MAC position data relayed by the gyroscope. In FIG. 32, the flow chart shows how the initial CEU programmed command angle $\bar{\theta}$ of horizontal is compared to the actual angle $\bar{\theta}$ of the gyro gimbal-synchronous longitudinal (roll) and pitch axis rotation of the MAC mount and load where the error difference $\epsilon\bar{\theta}$ is relayed by gyro pickoff synchro points to the CEU which in turn transmits amplified command voltage to the actuators 60 which thereby correct the angle error by adjusting the configuration of the MAC mount and load in a closed loop system. As the MAC dynamics are mirrored by the gimbals of the gyroscope, the correcting dynamics of the gyroscope are relayed via an analog-to-digital converter to the CEU. Plotted within the matrix memory of the microprocessor are the addresses of each strut 40 around the MAC mount circumferential plane in conjunction with separate address-assigned decoder circuits which apply address bus voltage to each actuator 60 individually and simultaneously based on the relative error registered at the associated gyroscope pickoff synchro points. As the recognized geometric pattern deviates from the horizontal plane as transmitted by the gyroscope, the CEU determines which pickoff point requires adjustment (i.e., a return to horizontal) and a correction algorithm adjusts the error by allocating control bus voltage to the associated actuator 60 based on the error function $\epsilon\bar{\theta}\text{---}=\theta-\bar{\theta}$. When sensors 2, 4, 6, and 8 initiate platform dynamics (see FIG. 28), an automatic control override of the activated open loop drive circuits is available to the CEU whereby one of the activated actuators 60 can be switched back to servo control. For example, if the sensor 130 at location 2 activates the actuators 60 at locations 1 and 3 and the apparatus 10 were to begin to list to one side due to topographical tilt, the apparatus 10 would be unable to level itself. Therefore, an override function is programmed into the microprocessor to allow the tilt-directed strut 40 to promptly switch to servo control to permit the leveling of the MAC load. When the apparatus 10 alights onto a flat surface whereby contact is made directly and uniformly along the apex of the concave undersurface 22 of base 20 whereat no sensor 130 is activated due to the designed locality discrimination of the sensor component, a programmed function of absolute motion (or the relative motion of members of an assembly with respect to an inertial reference) is employed with the gyroscope serving as the inertial reference when the vibration of touchdown causes kinetic drift of the gyroscope. The resultant velocity of vibratory motion is translated to the microprocessor which reactively commands a simultaneous closed loop contraction of the total strut 40 complement. The VARSLAP is able to maintain the stable, level profile of an aerospace craft by utilizing a plastic (i.e., variable) structure. The stability-plasticity dilemma is solved by the reactive controlled manipulation of the structure by the ADCS. One embodiment includes the platform-orientation-discrimination circuit herein described wherein each actuator prime mover is individually assigned a matrix address and operated accordingly by the ADCS.

In one alternative the Basal Sensor Array is omitted and the ADCS is used to maintain the MAC in a position that is perpendicular to the gravitational vector. The ADCS continues to adjust the struts until at least one of the struts is full retracted, all the while maintaining the perpendicular orientation.

Figure 35:
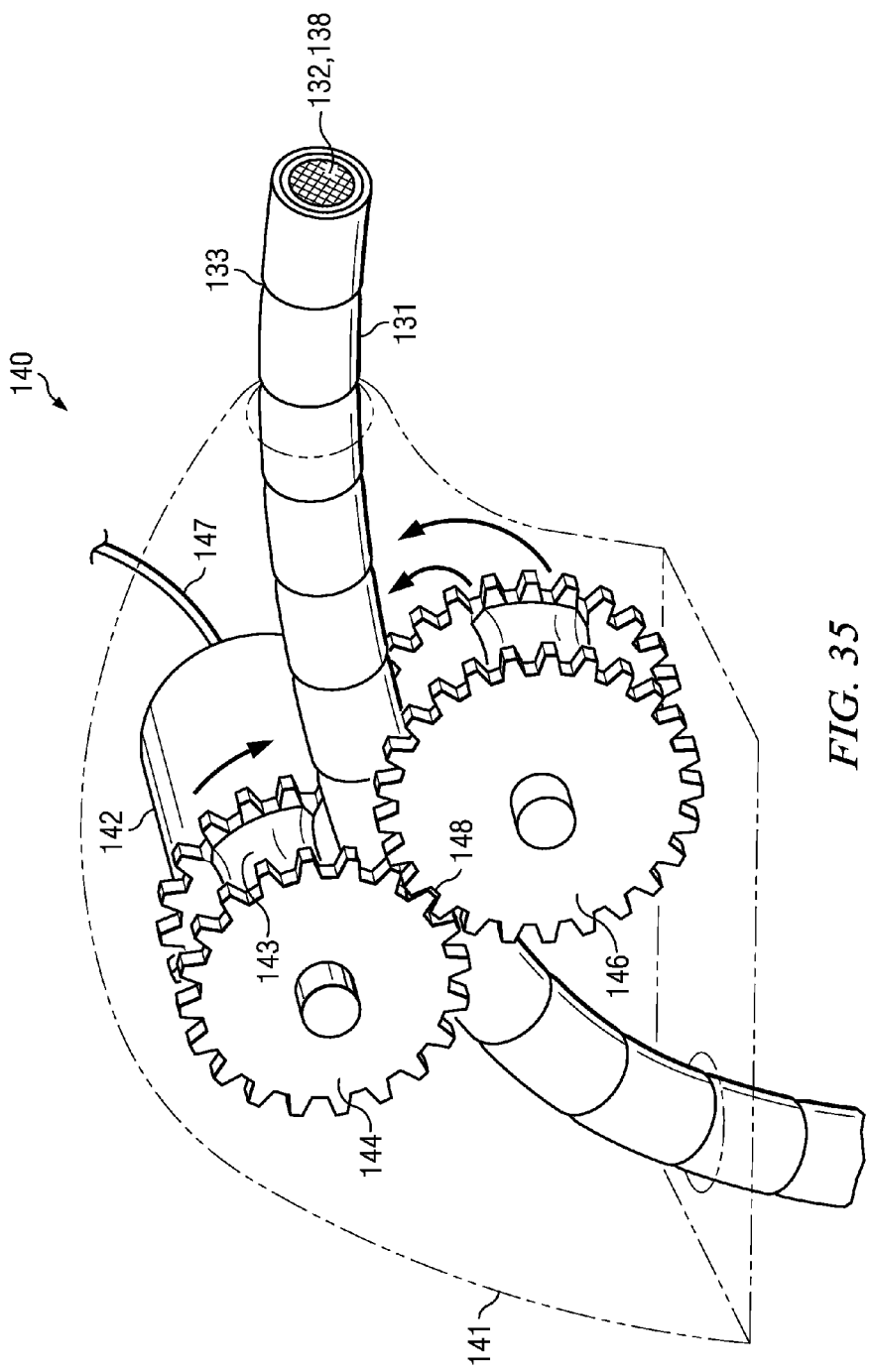
FIG. 35 is a perspective view of the takeup-dispenser motor.
Figure 36A:
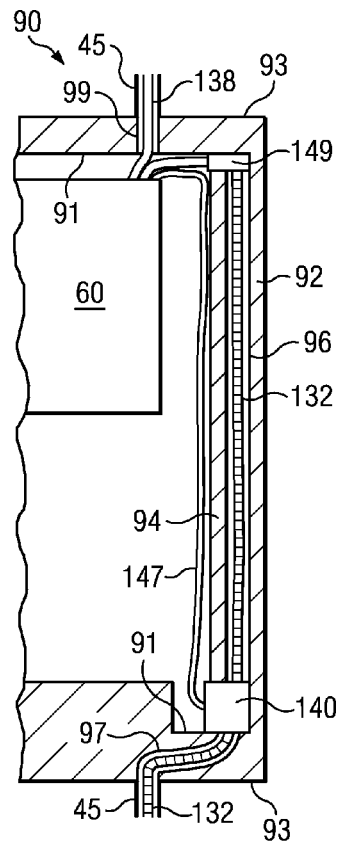
FIGS. 36(*a*) and (*b*) are cut away views of the cable management mechanism deployed within the strut actuator-housing structure.
Figure 36B:
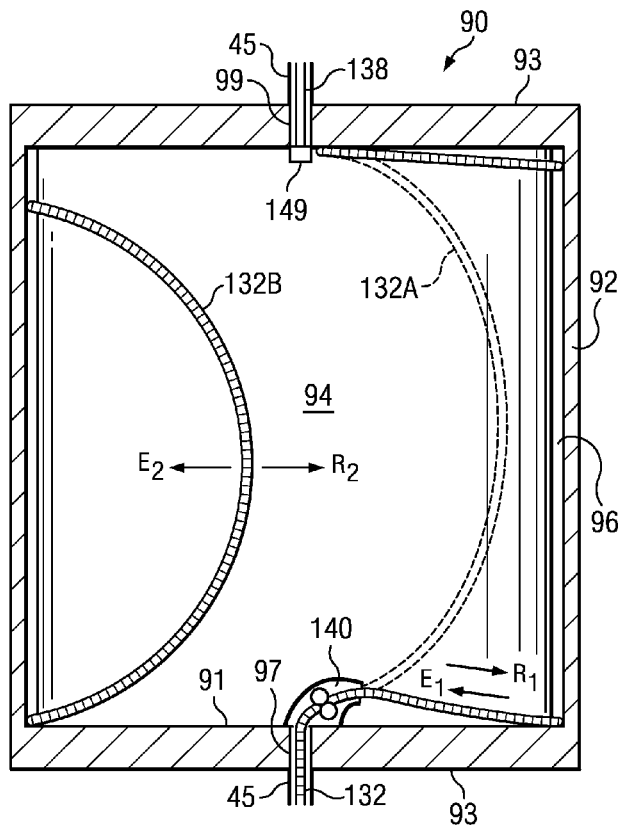

Cable Management System:

During the operation of the platform apparatus 10 whereby the adjustable struts 40 are extended and retracted throughout their range of motion, the electrical power cables requisite to the operation of the apparatus 10 are routed, meted, and secured by a cable management system consisting of nested cable columns (NCC), takeup-dispenser motors (TDM), and the secured storage areas 96 and 126 located within strut actuator-housing 90 and MAC mount 120, respectively. In FIG. 33, NCC 45 is shown to consist of a sliding sleeve structure comprising a set of three subset columns, each an extension component of nested strut 40 cylinders 41, 42, and 46. In FIG. 34, the abutting and interfacing surfaces of the subset structures which constitute NCC 45 are shown in cross section in relation to their parent cylinder to form a tube configuration enclosing either sensor cable 132, in the case of such NCC 45 situated between base 20 and housing 90, or actuator 60 power cable 138, in the case of such NCC 45 situated between housing 90 and MAC mount 120, through which cable conduit tube configuration therein formed pass cables 132 and 138. The linear allotment of each cable 132 and 138 within NCC 45 is controlled by a TDM, two per strut 40, with one the TDM situated within housing 90 and controlling sensor cable 132, and the other TDM situated within MAC mount 120 and controlling power cable 138. In FIG. 35, TDM 140 is a miniaturized electric motor with a rotor coil 142 being attached to cam drive spool 144 which drives a cam driven spool 146 by means of a physical connection such as interlinking gear teeth 148. Rotor coil 142, drive spool 144, and driven spool 146 are mounted to and enclosed within motor housing 141 which, by way of its form, directs the progression of cables 132 or 138 which are transmitted by the counter rolling action of drive spool 144 and driven spool 146. The specific lengths of the cables 132 and 138 which come into direct contact with spools 144 and 146 (the action lengths) are encased within a protective fluted cable sleeve 131 composed of a tough, flexible, non-binding material. The action length is manipulated by drive spool 144 and driven spool 146 whereat lateral knurls 143, being equably spaced along the concave cable-contacting surfaces of spools 144 and 146, synchronously mesh with the equably spaced circumferential grooves 133 of fluted cable sleeve 131 as indicated by the arrows in FIG. 35. An opposite configuration whereby spools 144 and 146 retain lateral grooves and cable sleeve 131 retains circumferential knurls along the action lengths also would be satisfactory as the same mated connection between structures would be extant. The area of juncture between drive spool 144 and driven spool 146 forms a snug ring of contact between the spools and cable sleeve 131 where mechanical friction between mated components is minimized. The invariable measured allotment system herein described provides a constant function operation under induced variable speed and temperature parameters which could impact the structural dynamics of the action lengths of cables 132 and 138 during the general operation of the apparatus 10. TDM 140 is connected in parallel with the drive circuits of actuator 60 in a schematic to impart a synchrophased operation whereby TDM 140 precisely follows the angular dynamics (i.e., velocity and direction) of its connected actuator 60. As the actuator rotates in a direction and velocity to extend strut 40, the linked TDMs 140 rotate in a matching direction and velocity to apportion the corresponding action lengths of cables 132 and 138. As actuator 60 rotates in the opposite direction to retract strut 40, the TDMs 140 rotate in the equivalent direction and velocity to gather the corresponding action lengths of cables 132 and 138 and deposit the action lengths within secured storage areas 96 and 126 respectively. In FIG. 36(a), the housing 90-situated DTM 140 is mounted within inner wall 94 upon the inner surface 91 of lower radial face wall 93 of housing 90 where it abuts the inner surface of outer wall 92. Power cable 147 by which TDM 140 is energized is attached to and ascends the inner surface of inner wall 94 where it connects to the control and power electronic circuits of actuator 60 which controls the TDM 140. Referring back to FIG. 29, sensor cable 132 is seen exiting base 20 and entering NCC 45 whereupon, in FIG. 36(a), it exits NCC 45, enters cable conduit 97 which tunnels the lower radial face wall 93 of housing 90, is routed through DTM 140, and traverses upward through the confines of secured storage area 96 to the right angle cable adapter 149 which is mounted within inner wall 94 against the inner surface 91 of upper radial face wall 93 where it abuts the inner surface of outer wall 92. A left rotational 90° turn of FIG. 36(a) provides the different angular reference perspective of FIG. 36(b), specifically within the confines of secured storage area 96 where the dashed line 132(a) represents the configuration of cable 132 illustrated in FIG. 36(a) and, causally, the configuration of sensor cable 132 during the full extension stage of strut 40. Right angle cable adapter 149 serves the purposes of: 1) physically securing cable 132 into place; 2) orienting cable 132 in the same and proper circumferential direction as that resolved by DTM 140, and; 3) shunting cable 132 toward the control and power electronic circuits of actuator 60 as seen in FIG. 36(a). During SAWU retraction of strut 40, DTM 140 (as powered by actuator 60) dispenses cable 132 along the inner surface 91 of lower radial face wall 93 within the confines of area 96 in the direction indicated by arrow $R_1$ (retract) whereupon cable 132(a) proceeds to conform to the confines of area 96 as it progresses circumferentially within housing 90 as indicated by arrow $R_2$ and as represented by cable loop 132(b). As long as DTM 140 dispenses cable 132, cable loop 132(b) can continue progressing beyond the original position of cable 132(a) and circling within area 96 as many times as required to attain the full retraction of strut 40. During the extension of strut 40 and the simultaneous takeup of cable 132 by DTM 140 as indicated by arrow $E_1$ (extend), cable loop 132(b) moves in the opposite direction around the circumference of housing 90 within area 96 as indicated by arrow $E_2$. Along the upper face 93 of housing 90 as shown in FIGS. 36(a) and (b), power cable 138 is seen extending from actuator 60 to which it is connected through cable conduit 99 which tunnels the upper radial face wall 93 and into NCC 45 where, in FIG. 37, cable 138 continues through cable conduit 128 which tunnels the lower wall 124 of MAC mount 120. The MAC mount 120-situated TDM 140 is mounted on the inner surface 121 of lower wall 124 of MAC mount 120 where it allocates the action lengths of cable 138 into and out of storage area 126 whereat cable 138 ultimately is connected to the voltage-regulating system (not shown). The MAC mount-situated DTM 140 also is connected to the voltage-regulating system via DTM 140 power cable 147 where the DTM receives synchronous feedback input from actuator 60 via a precision frequency inverter output signal sent back to the voltage-regulating system via actuator 60 power cable 138.

Anatomy of Touchdown:

In one embodiment. during descent as the aerospace craft approaches touchdown, the actuators 60 are energized, the ITL 70 is released, the SAWU is powered to the full extension stage, and the BSA is charged. ROD-mitigating devices such as descent thrusters and/or parachutes maintain the vehicle at horizontal as the base 20 impacts the surface. In scenario 1 where the touchdown point is flat and level, no discrete response is initiated in the BSA and the SAWU servomechanism control system lowers the vehicle to the pre-programmed stipulated (or landing-radar determined) height (e.g., between FIGS. 1 and 2) whereupon the SAWU is powered down and the ITL 70 is engaged. In scenario 2 where the touchdown point is unlevel as represented by a sloped or uneven, boulder-strewn surface, the initial high point of contact with the base 20 activates the BSA causing the localized sensor 130 to signal the associated actuator(s) 60 to bypass the servo control circuit and drive the corresponding strut(s) 40 to the full retraction stage while the remaining struts 40, still under servo control, maintain the MAC load at a horizontal profile. If the sensor 130 at locations 1, 3, 5, or 7 is activated (see FIG. 28), the platform apparatus 10 will appear similar to the profile shown in FIG. 3. If the sensor 130 at locations 2, 4, 6, or 8 is activated, the apparatus 10 will appear similar to the profile shown in FIG. 4. After the MAC load settles at the stable horizontal profile, the SAWU is powered down and the ITL 70 is engaged.

The different procedures presented above represent possible general methods of use of the VARSLAP in remote-operation scenarios based on variable contingencies likely experienced in environmental conditions for which the VARSLAP was conceived and realized.

Figure 37:
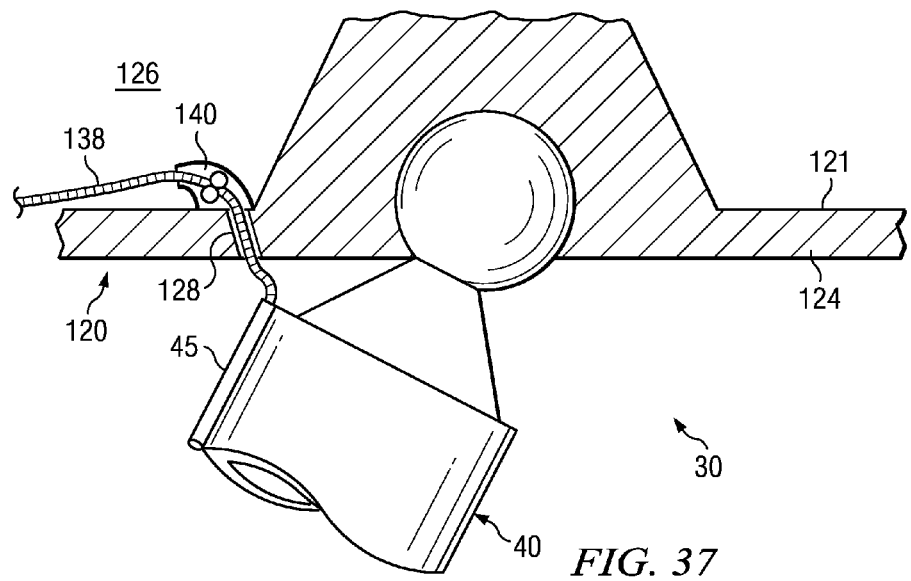
FIG. 37 is a cut away view of the cable management mechanism deployed within the MAC mount structure.
Figure 38:
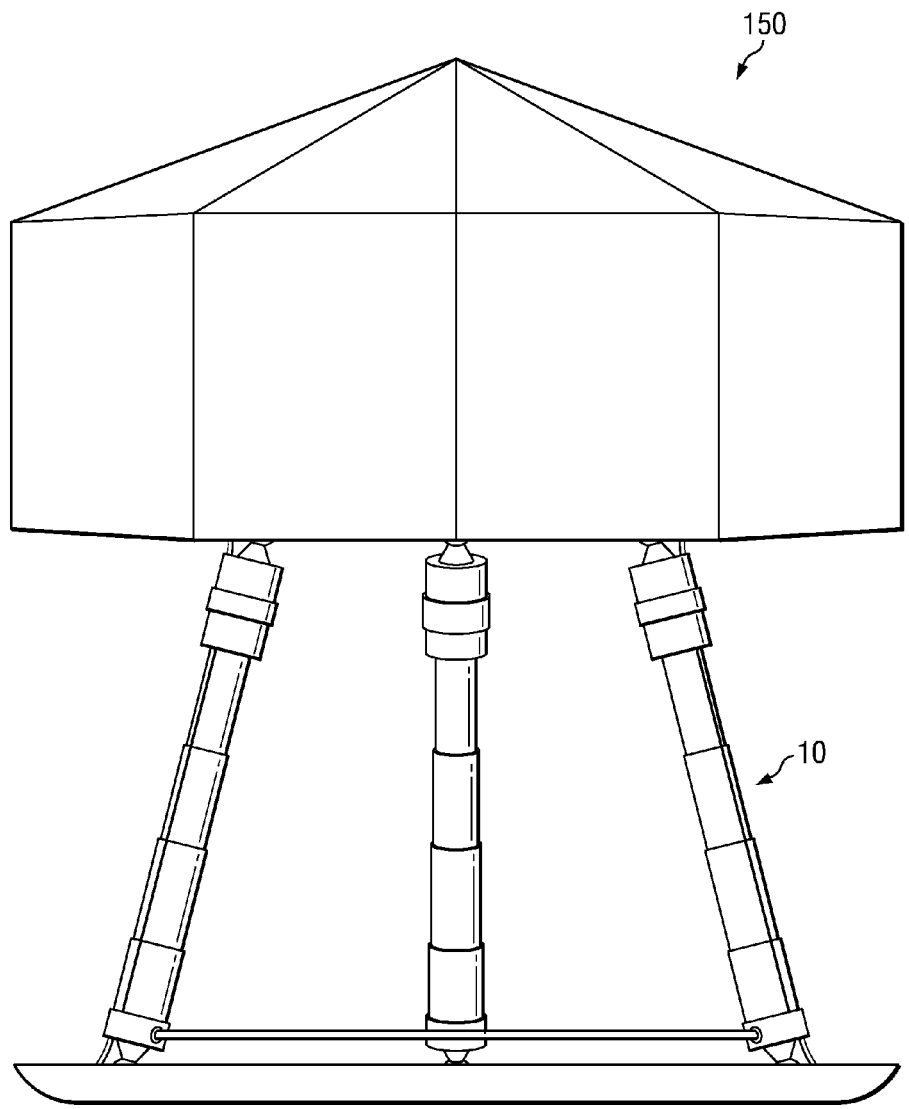
FIG. 38 is a perspective view of one embodiment of a VARSLAP.

Variations:

FIG. 38 shows a possible variation of the VARSLAP deployed in the fully extended stage. Major alterations from the model presented throughout this application include the following:

1) A tripod strut 40 configuration—This minimal arrangement may be adequate for smaller vehicles. A correspondingly increasing number of struts 40 can be integrated into a platform with an increasing size and mass of the supported aerospace craft;

2) No MAC mount 120 extant—As stated earlier in this application, the VARSLAP can be integrated within the structure of the aerospace craft. FIG. 38 can be described as "an aerospace craft 150 with a VARSLAP 10 gear". The aerospace craft itself serves the function of the MAC mount 120 component that has been explicated in this application;

3) A single-pole output actuator 60—The actuators 60 here are designed and manufactured in the standard mode of a single-pole output. In this model, the EAJ 30 directly connects housing 90 to the MAC wherein the funnel subunit 36 of rocking unit 32 is attached directly onto the upper radial face wall 93 of the housing and the ball subunit 34 of the rocking unit is secured within the body of the MAC in a similar manner as shown in FIG. 37 where the ball subunit is secured within the MAC mount 120. The cable 138 management system is not required as the cable is fed directly from actuator 60 to the voltage-regulation system within the body of the MAC. This model has the advantage of a simpler design and less costly construction but limits the degrees of slope gradient accessibility due to the single spring 50 per actuator 60 arrangement, except in the case of the following;

4) Four cylinders (42, 46, 41a, and 41b) per linear deflection vector—The proposed coil spring 50 illustrated in FIG. 11 is shown extended to its proposed maximum length in FIG. 12 whereby the maximum constitutes only a ⅓ increase in length beyond the neutral length of FIG. 11, while a full compression of FIG. 11 results in a two-fold decrease in length as depicted in FIG. 13. The assumption is that an extreme extension under torque load is more stress-limiting than a comparable compression to solid height stage. Under these conditions, the resultant 3:1 ratio of maximum deflection range between fully extended and fully compressed would require (for maximum efficiency) a comparable ratio of the cylinders which slide with the spring. The four cylinders per strut 40 configuration presented in FIG. 38 implies a coil spring 50 with the proposed capacity of extension to twice the neutral length leading to a 4:1 ratio of maximum deflection range differential. Given this possibility, the apparatus 10 depicted in FIG. 38 should exceed the degrees of slope gradient accessibility of the apparatus 10 delineated throughout this application.

Figure 30:
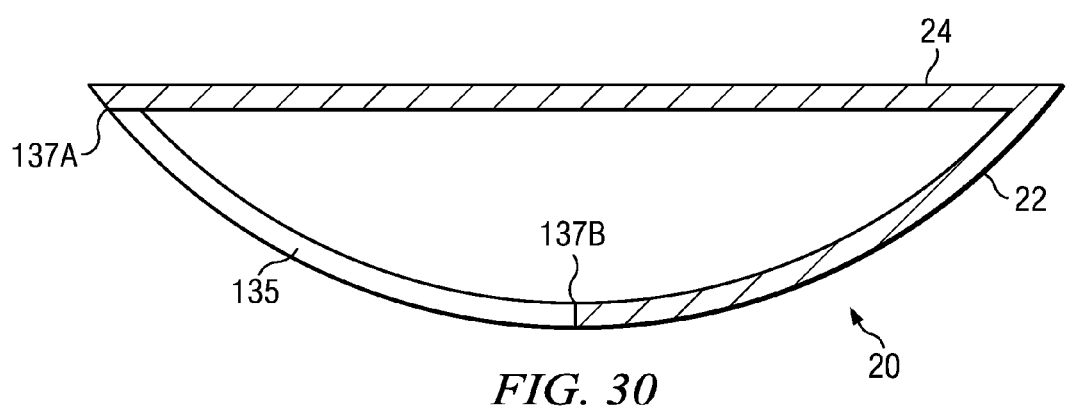
FIG. 30 is a cut away side view showing the vibration isolation partition within the base structure.
Figure 31:
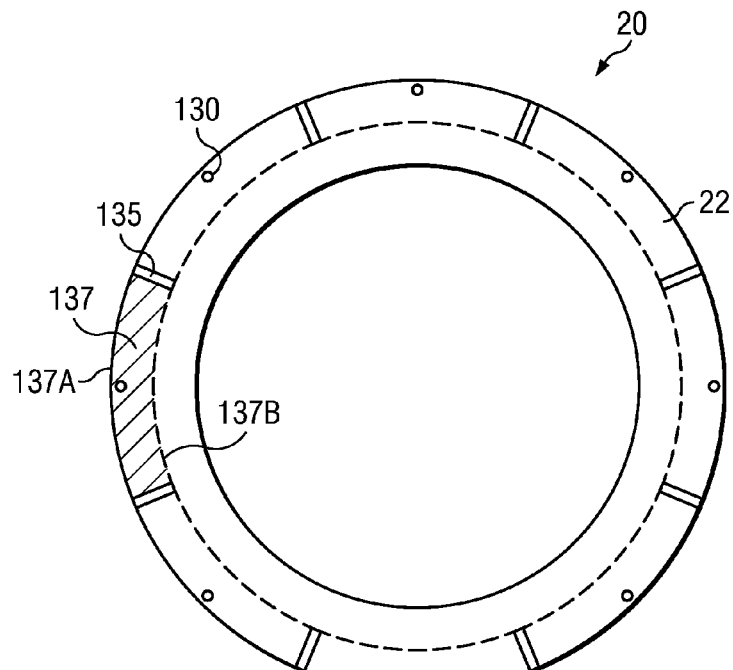
FIG. 31 is a bottom side view of the base illustrating the vibration isolation system.

To effect the solitary sensor 130 transmission function of the BSA, a basal structural damping scheme is presented instituting a sensor-segregation and vibration isolation configuration which embodies adjacently situated vibration isolation compartments (VICs) which are separated and partially delineated by equably positioned vibration isolation partitions (VIPs). In FIG. 30, a possible structural representation of a VIP 135 is shown in a form composed of a vibration-damping material situated within the structure of undersurface 22 of base 20 and designed to disrupt through absorption the transmission of the longitudinal and shear vibrations of touchdown. In FIG. 31, the topology of the VIP 135 components is shown in interspersion with that of sensors 130 wherein the VIPs delineate the radial boundaries of the VICs 137, here described as the area encompassing the structural field of sensitivity within which is situated sensor 130, and wherein the adjoining surfaces 137a of undersurface 22 with uppersurface 24 and the apex line 137b of convex undersurface 22 delineate the outer and inner circumferential boundaries, respectively, of the VICs 137. The vibration isolation system (VIS) herein described is designed to impede the linear transmission of translational shock vibrations along the gradient-impacting face of undersurface 22 originating from the longitudinal and shear shock excitation at the basal point of touchdown. As touchdown impact occurs at a given point along a VIC 137 and vibrations within the VIC are transmitted to the associated sensor 130, the vibrations are inhibited by the constituent VIPs 135 from entering adjacent VICs 137 and, by association, the adjacent sensors 130, which thereby provides a single, unambiguous point-source of excitation from the primary sensor 130. The VIP 135 is a resilient, load-supporting structure with a viscoelastic energy-dissipating mechanism provided by a single form. For example, polymeric material is widely used within industrial and military/aerospace applications in forms such as, but not limited to, polyurethanes, poly(vinyl acetate) and copolymers, acrylics, and natural and synthetic rubbers. One option includes interpenetrating polymer networks (IPNs) which provide damping over broad temperature and vibration frequency ranges. Given anticipated ambient temperature and frequencies of vibration parameters encountered within the touchdown environment, a site-specific polymer glass transition region, as known to those skilled in the art, can be designed within the elastomer for maximum damping capability. The heretofore described signal compartmentalization method whereby signal emanation from a specific delineated area initiates a response to the signal based on the geometric configuration, location, and orientation of the delineated area of sensory input thereby allowing a certain precision of operation in relation to the delineated area of sensory input is an embodiment.

The form of the apparatus 10 presented throughout this application as well as the mode presented within this section represent variations on the general theme of landing a vehicle safely on a variable surface, and which is actualized by a geometric separation of the dimensional plane of the surface from that of the vehicle load by the implementation of a state of disjunctive planar dynamics whereby a plastic frame component which connects the components of and disjoins the actions of the surface-reactive base component and the stability-induced vehicle load actively manipulates the inertia of the latter by the creation of a descending horizontal plane of stability. Disjunctive planar dynamics is a process whereby a load is positioned onto an inclined surface in a stable configuration by an interaction between a surface-cohering plane component and a load-supporting and manipulating plane component, the latter which facilitates the gravitational vector of the load which, in turn, reinforces the coherence of the surface-cohering component.

The methods, structures, and materials described heretofore to accomplish the stated theme are presented to provide a breath of scope in conformance with the introduction and development of a new technology. Any variation on the theme and methodology of accomplishing the same that are not described heretofore would be considered under the scope of embodiments of the VARSLAP.

I claim:

1. A method of positioning a load on a surface, the method comprising:
    (a) contacting the surface with a landing body;
    (b) initiating a disjunctive planar dynamic between the surface and the load by maintaining the plane of the load independently of the plane of the surface, wherein the load is interconnected with the landing body, whereby said interconnection impose a counter-gravitational force against the plane of contact of the load with the interconnection and the plan of contact of the landing body with the interconnection thereby disassociating the relative motions of said planes; and
    (c) bringing the load to rest.

2. The method of claim 1, wherein the load is interconnected with the landing body via at least 3 adjustable struts.

3. The method of claim 2, further comprising
    (d) sensing the contacting of (a) with a sensor corresponding to a first one or two of the at least 3 adjustable struts; and
    (e) contracting the first one or two of the at least 3 adjustable struts, whereby said sensor initiates the function of (b).

4. The method of claim 3, further comprising:
    (f) maintaining the load perpendicular to a gravitational vector by adjusting the at least three adjustable struts until the load is at rest.

5. A method of positioning a load on a surface, the method comprising:
    (a) contacting the surface with a landing body;
    (b) initiating a disjunctive planar dynamic between the surface and the load by maintaining the plane of the load independently of the plane of the surface, wherein the load is interconnected with the landing body; and
    (c) bringing the load to rest.

6. The method of claim 5 further comprising:
    (d) contacting a load with a dynamically unstable surface;
    (e) initiating a disjunctive planar dynamic between the surface and the load, wherein the load is interconnected with the surface; and
    (f) maintaining the load at a level attitude.

* * * * *